(12) United States Patent
Somavarapu

(10) Patent No.: US 7,480,778 B2
(45) Date of Patent: Jan. 20, 2009

(54) METHOD AND SYSTEM FOR MANAGING POINT-IN-TIME IMAGES

(75) Inventor: Nagender Somavarapu, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 627 days.

(21) Appl. No.: 11/211,219

(22) Filed: Aug. 24, 2005

(65) Prior Publication Data

US 2007/0016740 A1    Jan. 18, 2007

(30) Foreign Application Priority Data

Jun. 29, 2005    (IN) .................................... 821/05

(51) Int. Cl.
*G06F 12/00* (2006.01)

(52) U.S. Cl. ............................ 711/159; 711/4; 711/100; 711/145; 711/147; 711/152

(58) Field of Classification Search ................. 711/159, 711/4, 100, 145, 147, 152
See application file for complete search history.

(56) References Cited

U.S. PATENT DOCUMENTS 7,100,089 B1 *   8/2006   Phelps ......................... 714/42
7,191,304 B1 *   3/2007   Cameron et al. ............. 711/202
7,334,095 B1 *   2/2008   Fair et al. .................... 711/161

* cited by examiner

*Primary Examiner*—Stephen C Elmore
(74) *Attorney, Agent, or Firm*—Perkins Coie LLP

(57) ABSTRACT

A point-in-time image of data in stored in a storage system is identified. Dependencies from the point-in-time image are detected. The dependencies are broken in an order before the point-in-time image is deleted. In one embodiment, an order in which to break the dependencies is presented to a user via one or more graphs. Based on the one or more graphs, the user determines a manner in which to break the dependencies.

27 Claims, 18 Drawing Sheets

| Name | Order |
|---|---|
| Post-order traversal | LC3, LC6, LC7, LC4, LC1, LC5, LC2, Point-in-time image |
| | VC4, VC7, VC5, VC1, VC2, VC8, VC6, VC3, Point-in-time image |
| | PTI3, PTI4, PTI1, PTI5, PTI6, PTI2, Point-in-time image |
| Level-by-level | LC6, LC7, LC3, LC4, LC5, LC1, LC2, Point-in-time image |
| | VC7, VC8, VC4, VC5, VC6, VC1, VC2, VC3, Point-in-time image |
| | PTI6, PTI5, PTI4, PTI3, PTI2, PTI1, Point-in-time image |

METHOD AND SYSTEM FOR MANAGING POINT-IN-TIME IMAGES

TECHNICAL FIELD

At least one embodiment of the present invention pertains to storage systems, and more particularly, to a method and system for managing point-in-time images in a storage system.

BACKGROUND

A storage server is a special-purpose processing system used to store and retrieve data on behalf of one or more client processing systems ("clients"). A storage server can be used for many different purposes, such as to provide multiple users with access to shared data or to backup mission critical data.

One example of a storage server is a file server. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID), sometimes known as "Redundant Array of Independent Disks." Some storage servers provide clients with block-level access to stored data, instead of or in addition to file-level access.

A block is a logical unit of data stored on a storage device. Files, and other data, stored on the mass storage devices are typically stored in the form of one or more blocks. A file may include pointers referencing one or more blocks that store the data comprising the file.

To provide a version of data (e.g. files) stored in one or more mass storage devices at a particular point in time, storage systems may create persistent point-in-time images of data. A point-in-time image of data is a read-only view of data in a data set at a particular point in time. Objects may be created to provide access to or to replicate a point-in-time image. For example, a logical unit number (LUN) clone may be created to provide access to a subset of the contents in a volume of data. A volume clone may be created to provide access to the entire contents of the volume of data. These objects are dependent on the point-in-time image.

A point-in-time image may be used to restore a state of the stored data in the event of, for example, a catastrophic failure of the storage system or corruption of data. The ability to restore data from a point-in-time image provides administrators with a simple mechanism to revert the state of their data to a known previous state in time as captured by the point-in-time image.

Over time, a point-in-time image stored in a storage system may become obsolete. To free up storage space in the storage system, a user (e.g. an administrator) may want to delete the obsolete point-in-time image. However, before the point-in-time image is deleted, the point-in-time image's dependent relationships should be broken to prevent dependent objects from referencing a non-existent point-in-time image.

Identifying these relationships, and determining an order and manner in which to break them, can be complicated. For example, when a storage system is configured to automatically generate point-in-time images, the number of point-in-time images and the number and levels of dependencies can become extensive. This complexity makes it difficult for an administrator to manage the point-in-time images and, in particular, to identify which dependencies to break and in which order.

Therefore, what is needed is a method and system for more effectively managing point-in-time images in a storage system.

SUMMARY

The present invention includes methods and systems for managing point-in-time images of data in a storage system. In one method, dependencies of a point in time image are identified. The dependencies are broken in an order. After the dependencies are broken, the point-in-time image is deleted.

Other aspects of the invention will be apparent from the accompanying figures and from the detailed description which follows.

BRIEF DESCRIPTION OF THE DRAWINGS

One or more embodiments of the present invention are illustrated, by way of example and not limitation, in the figures of the accompanying drawings, in which like references indicate similar elements and in which.

DETAILED DESCRIPTION

Figure 1:
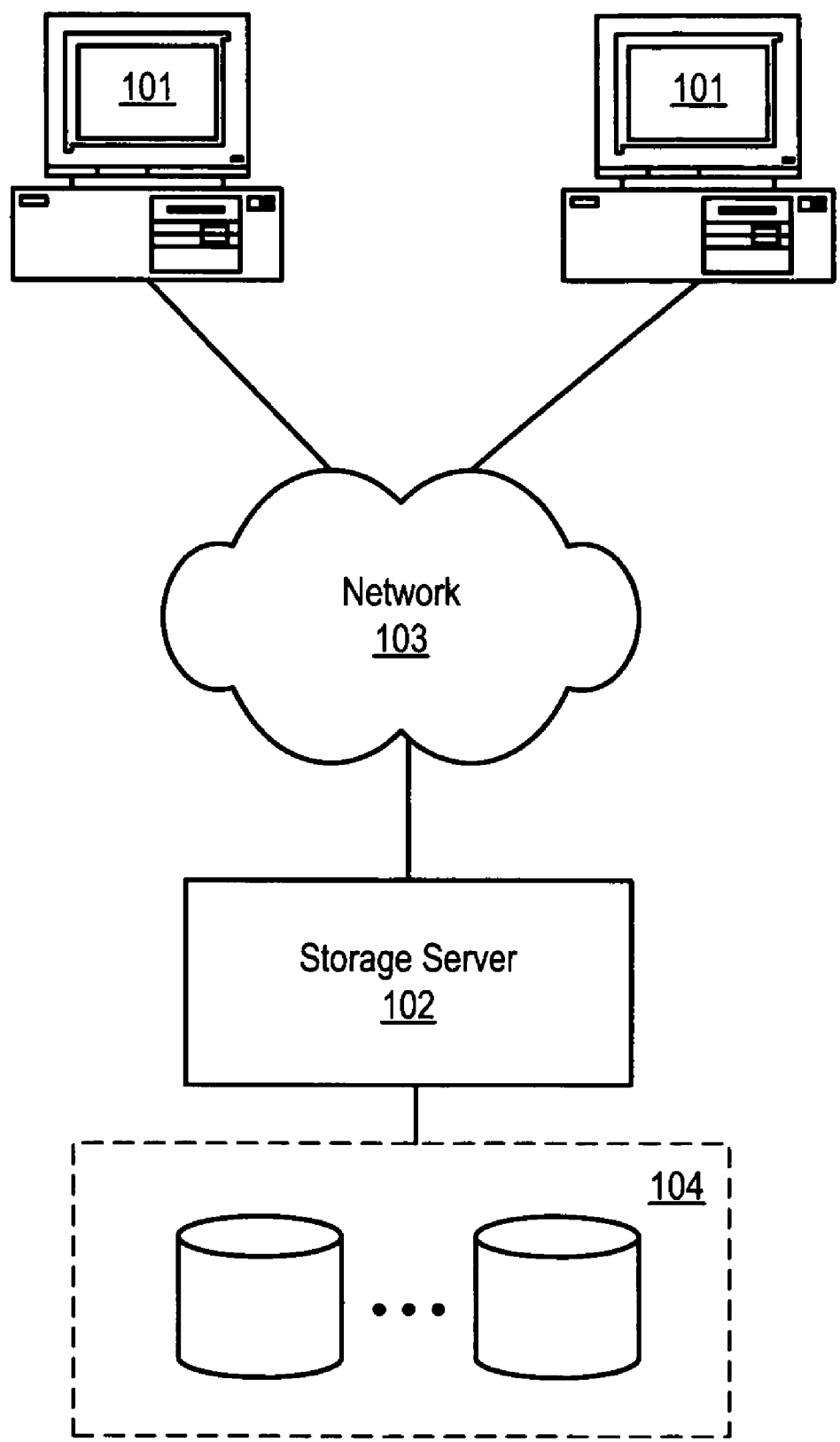
FIG. 1 shows a network environment that includes a storage server which implements one embodiment of the invention.

A method and system for managing point-in-time images in a storage system are described. A point-in-time image of data is a persistent read-only view of data in a data set. A point-in-time image captures the state of the data at the point in time that the image was taken and may thereby provide access to old versions of data. A point-in-time image may be a read-only view of a file, a directory hierarchy, a volume (e.g. a file system volume), or a logical unit number (LUN), for example. A volume is a logical collection of data that may include one or more physical data storage devices, such as magnetic or optical storage.

An example of a point-in-time image is a Snapshot™ from Network Appliance, Inc. of Sunnyvale, Calif. A file server, e.g. Filer also from Network Appliance, Inc. of Sunnyvale, Calif., may generate a Snapshot™ of data stored in a storage system. Creation of a Snapshot™ or restoring from a Snapshot™ can be controlled from client-side software tools, such as SnapDrive™ or SnapManager®, both also made by Network Appliance, Inc. of Sunnyvale, Calif.

When a point-in-time image is created which refers to certain data blocks, those data blocks are "locked." When a data block is "locked", an object (e.g. a point-in-time image) or an operation is dependent on the data block, thereby preventing the data block from being deleted until after the dependent relationship is broken. Breaking the dependent relationship before deleting the locked data block ensures that an existing object or operation does not reference a non-existent data block.

Similarly, when an object is created which refers to a point-in-time image, the point-in-time image is "locked." Accordingly, before the point-in-time image can be properly deleted, the relationship between the dependent object and the point-in-time image is broken to prevent the object from referencing a non-existent point-in-time image.

The relationship between a dependent object and a given point-in-time image is referred to as a "dependency." The manner in which a point-in-time image dependency is broken depends on the object or operation that depends on the point-in-time image, as will be described in more detail below.

Embodiments of this invention identify dependencies of a point-in-time image. In certain embodiments, a graph is generated to present these dependencies to a user. The dependencies are broken in an order, and then the point-in-time image is deleted. In such a manner, point-in-time images in a storage system are managed more effectively.

The point-in-time image management technique introduced herein will now be described in greater detail. The following provides variations and examples of various aspects of embodiments of the invention. It will be appreciated that the following variations and examples are not intended to be exhaustive or to limit the invention to the precise forms disclosed. These variations and examples are to provide further understanding of embodiments of the present invention.

FIG. 1 shows a network environment that includes a storage server which implements one embodiment of the invention. In FIG. 1, a storage server 102 is coupled locally to a storage subsystem 104 which includes a set of mass storage devices. The storage server 102 may be, for example, a file server, a block-level server, or a combination thereof. The storage subsystem 104 is managed by the storage server 102. The storage server 102 is also coupled to a set of clients 101 through a network 103, such as a local area network (LAN). Each of the clients 101 may be, for example, a conventional personal computer (PC), workstation, or the like.

The storage server 102 receives and responds to various read and write requests from the clients 101, directed to data stored in or to be stored in the storage subsystem 104, such point-in-time images. The clients 101 typically communicate with the storage server 102 by exchanging discrete frames or packets of data formatted according to predefined network communication protocols, such as the Transmission Control Protocol/Internet Protocol (TCP/IP). In this context, a protocol consists of a set of rules defining how the interconnected computer systems interact with one another. The mass storage devices in the storage subsystem 104 may be, for example, conventional magnetic disks, optical disks such as CD-ROM or DVD based storage, magneto-optical (MO) storage, or any other type of non-volatile storage devices suitable for storing large quantities of data. The mass storage devices are logically organized into volumes.

The storage server 102 may have a distributed architecture; for example, it may include a separate N-(network) blade and D-(disk) blade (not shown). In such an embodiment, the N-blade is used to communicate with clients 101, while the D-blade includes the file system functionality and is used to communicate with the storage subsystem 104. Further, the N-blade and D-blade are in communication. Alternatively, the storage server 102 may have an integrated architecture, where the network and data components are all contained in a single box. The storage server 102 further may be coupled through a switching fabric to other similar storage servers (not shown) which have their own local storage subsystems. In this way, all of the storage subsystems can form a single storage pool to which any client of any of the storage servers has access.

Figure 2:
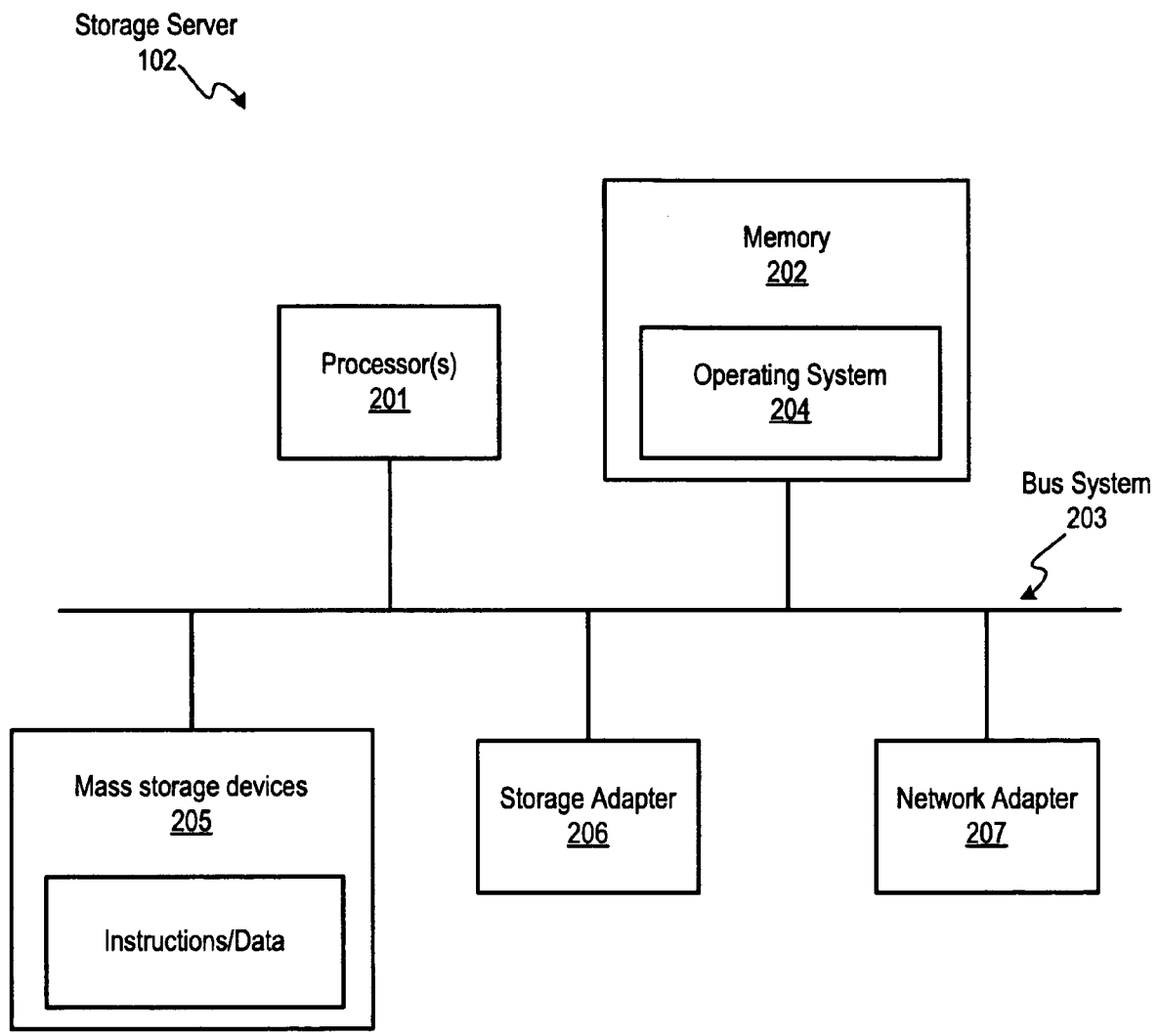
FIG. 2 is a block diagram showing the architecture of a storage server that can implement one embodiment of the invention.

FIG. 2 is a block diagram showing the architecture of a storage server that can implement one embodiment of the invention. The storage server 102 includes one or more processor(s) 201 and memory 202 coupled to a bus system 203. The bus system 203 shown in FIG. 2 is an abstraction that represents any one or more separate physical buses and/or point-to-point connections, connected by appropriate bridges, adapters and/or controllers. The bus system 203, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 201 are the central processing units (CPUs) of the storage server 102 and, thus, control the overall operation of the storage server 102. In certain embodiments, the processor(s) 201 accomplish this by executing software stored in memory 202. The processor(s) 201 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 202 includes the main memory of the storage server 102. Memory 202 represents any form of random access memory (RAM), read-only memory (ROM), flash memory, or the like, or a combination of such devices. The operating system 204 of the storage server 102 operates using memory 202. The point-in-time image management technique introduced above can be implemented in the operating system 204.

Also connected to the processor(s) 201 through the bus system 203 are one or more internal mass storage devices 205, a storage adapter 206 and a network adapter 207. Internal mass storage devices 205 may be or include any conventional medium for storing large volumes of data in a non-volatile manner, such as one or more magnetic or optical based disks. The storage adapter 206 allows the storage server 102 to access the storage subsystem 104 and may be, for example, a Fibre Channel adapter or a SCSI adapter. The network adapter 207 provides the storage server 102 with the ability to communicate with remote devices, such as the clients 101, over a network and may be, for example, an Ethernet adapter.

Figure 3:
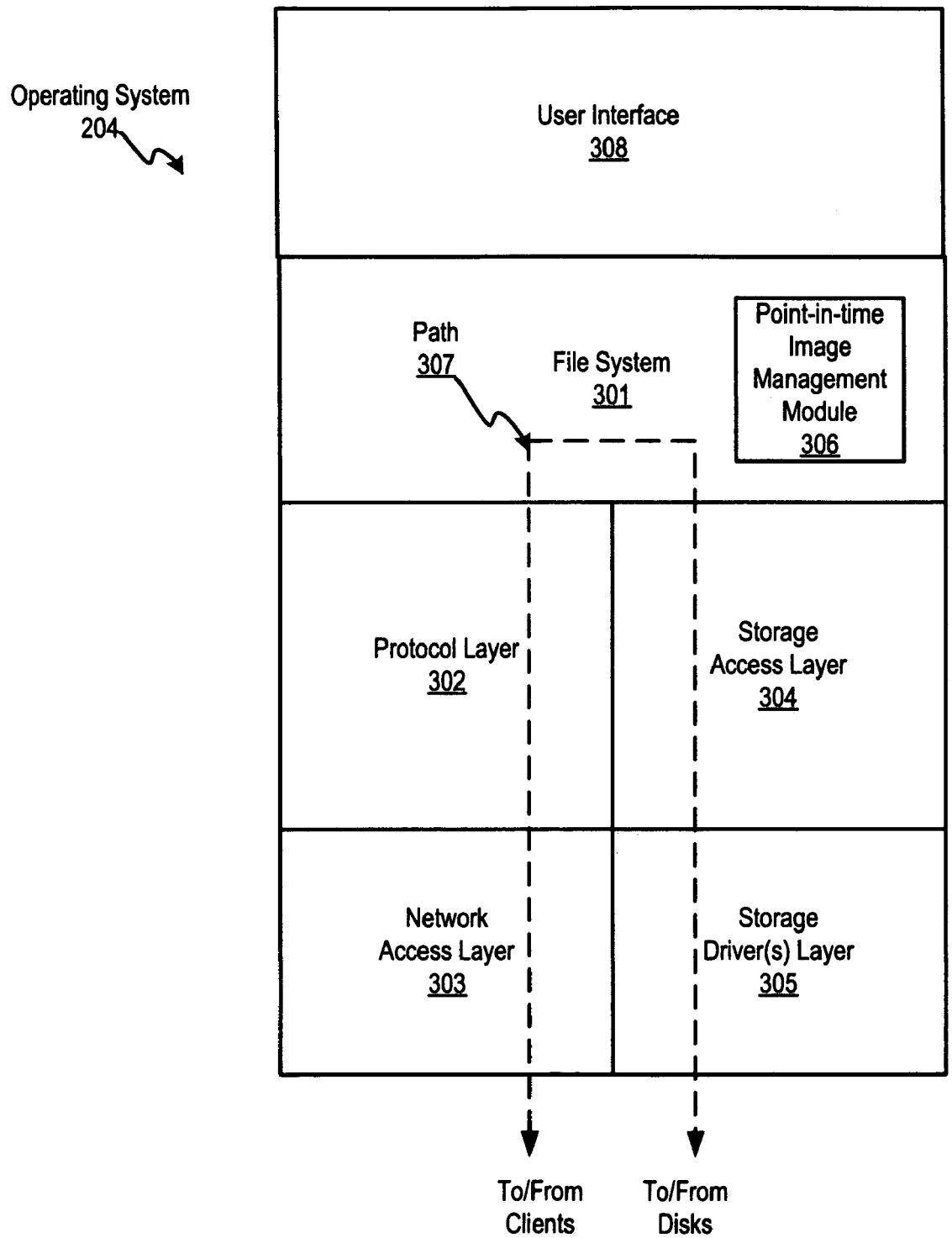
FIG. 3 is a block diagram showing the operating system of a storage server according to one embodiment of the invention.

FIG. 3 is a block diagram showing the operating system of a storage server according to one embodiment of the invention. As shown, the operating system 204 (e.g. the Data ONTAP™ operating system made by Network Appliance, Inc. of Sunnyvale, Calif.) includes several modules, or "layers". These layers include a file system 301 (e.g. the WAFL® file system made by Network Appliance, Inc. of Sunnyvale, Calif.). The file system 301 is application-layer software that keeps track of the directory structure (hierarchy) of the data stored in the storage subsystem 104 and manages read/write operations on the data (i.e. executes read/write operations on the disks in response to client requests). Point-in-time image management module 306 operates inside the file system 301.

The point-in-time image management module 306 performs the point-in-time image management technique introduced herein, including identifying point-in-time image dependencies. In certain embodiments, the point-in-time image management module 306 may also generate a graph of the dependencies to present to a user, receive input from a user to break certain dependencies, and/or issue commands to delete point-in-time images stored in the storage subsystem 104, as described in further detail below. In certain embodiments, the point-in-time image management module 306 may also create point-in-time images, as well as the objects that depend on the point-in-time image.

Logically "under" the file system 301, the operating system 204 also includes a protocol layer 302 and an associated network access layer 303, to allow the storage server 102 to communicate over the network 103 (e.g. with clients 101). The protocol 302 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 303 includes one or more drivers which implement one or more lower-level protocols to communicate over the network, such as Ethernet or Fibre Channel.

Also logically under the file system 301, the operating system 204 includes a storage access layer 304 and an associated storage driver layer 305, to allow the storage server 102 to communicate with the storage subsystem 104. The storage access layer 304 implements a higher-level disk storage protocol, such as RAID, while the storage driver layer 305 implements a lower-level storage device access protocol, such as Fibre Channel Protocol (FCP) or SCSI.

The operating system 204 also includes a user interface 308 through which a network administrator or other user can control and/or configure the storage server 102, e.g. remotely from a management station. The user interface 308 may generate a command line interface and/or a graphical user interface for this purpose. Through the user interface, a user can, for example, view a graph of point-in-time image dependencies, determine the manner in which to break a certain dependency, and/or issue commands to break dependencies and delete point-in-time images.

Also shown in FIG. 3 is the path 307 of data flow, through the operating system 204, associated with a read or write operation of data stored in the storage subsystem 104.

Figure 4:
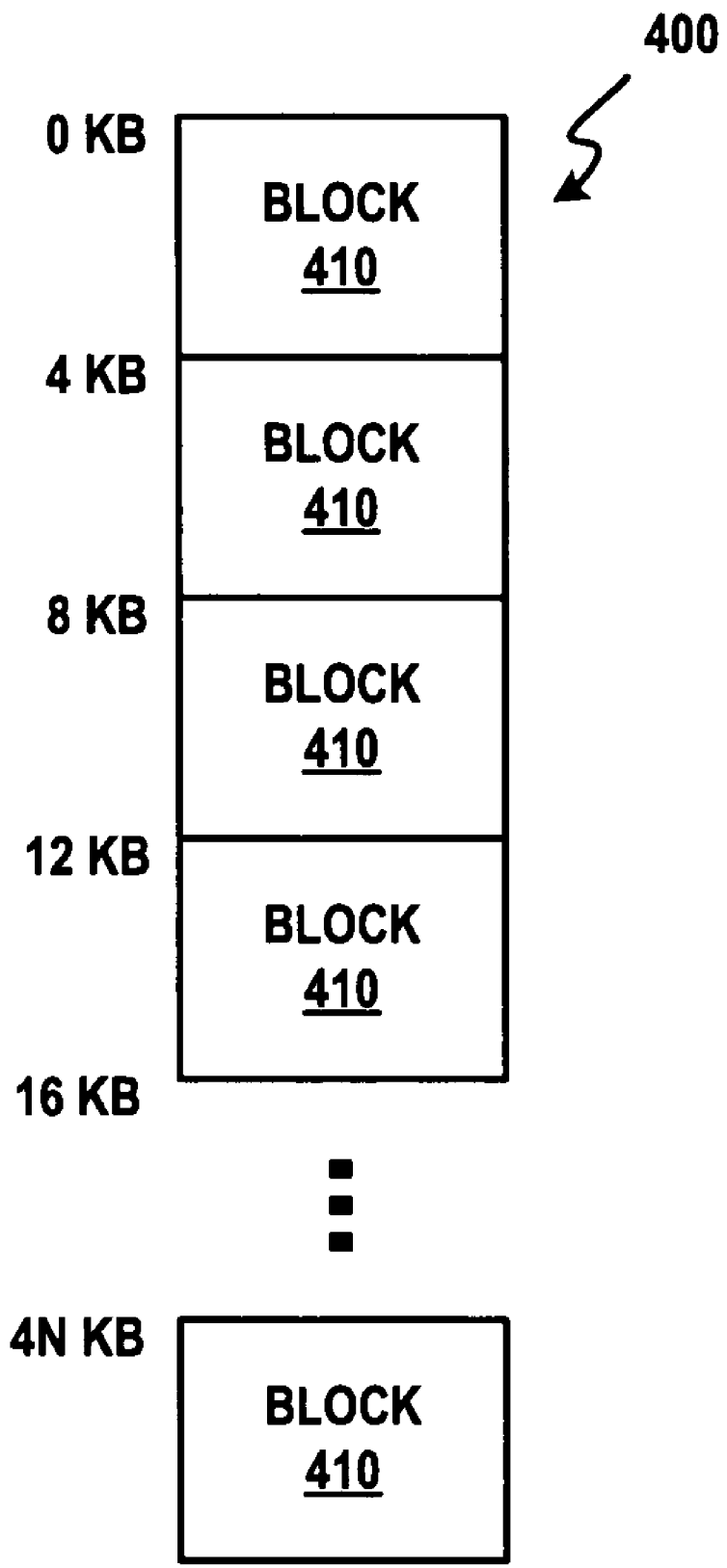
FIG. 4 illustrates how a file is broken up into blocks for storage.

FIG. 4 illustrates how a file can be broken up into blocks for storage. As used herein, the term "block" can mean any chunk of data which the file system 301 is capable of recognizing and manipulating as a distinct entity. As previously stated, files and other data stored on mass storage devices are typically stored in the form of one or more blocks. A file may include pointers referencing one or more blocks that store the data comprising the file. In FIG. 4, the blocks 410 are 4 Kbytes, although it shall be appreciated that in other embodiments of the invention a block may be a different size.

Figure 5A:
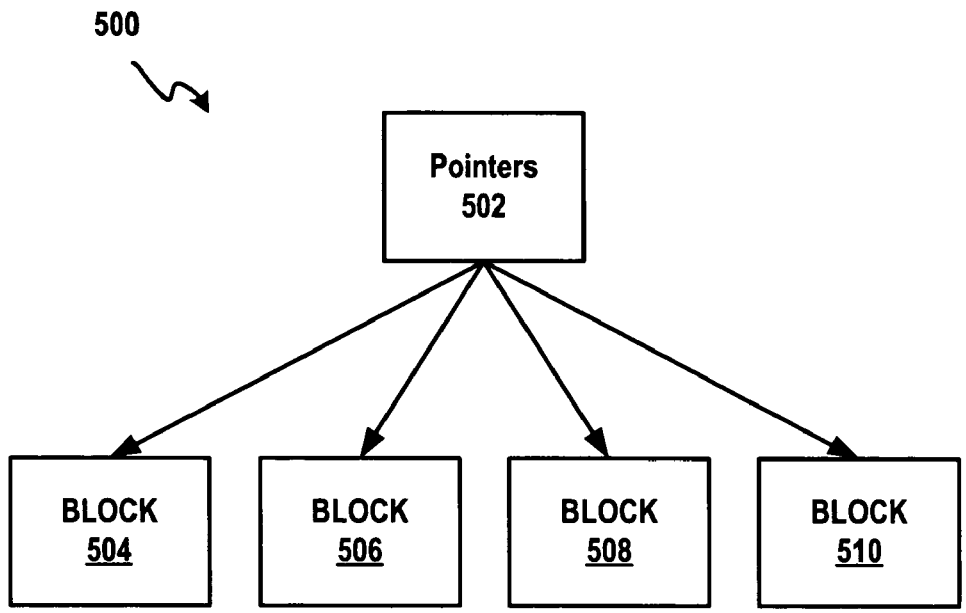
FIG. 5A-5C illustrates a technique for creating point-in-time images in accordance with one embodiment of the invention.
Figure 5B:
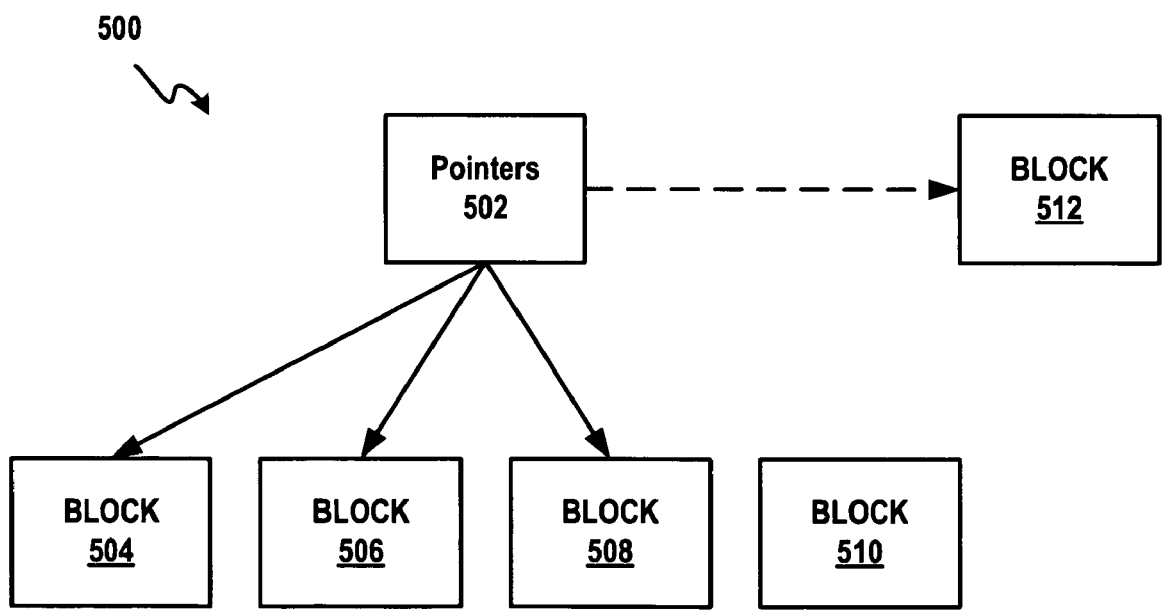
Figure 5C:
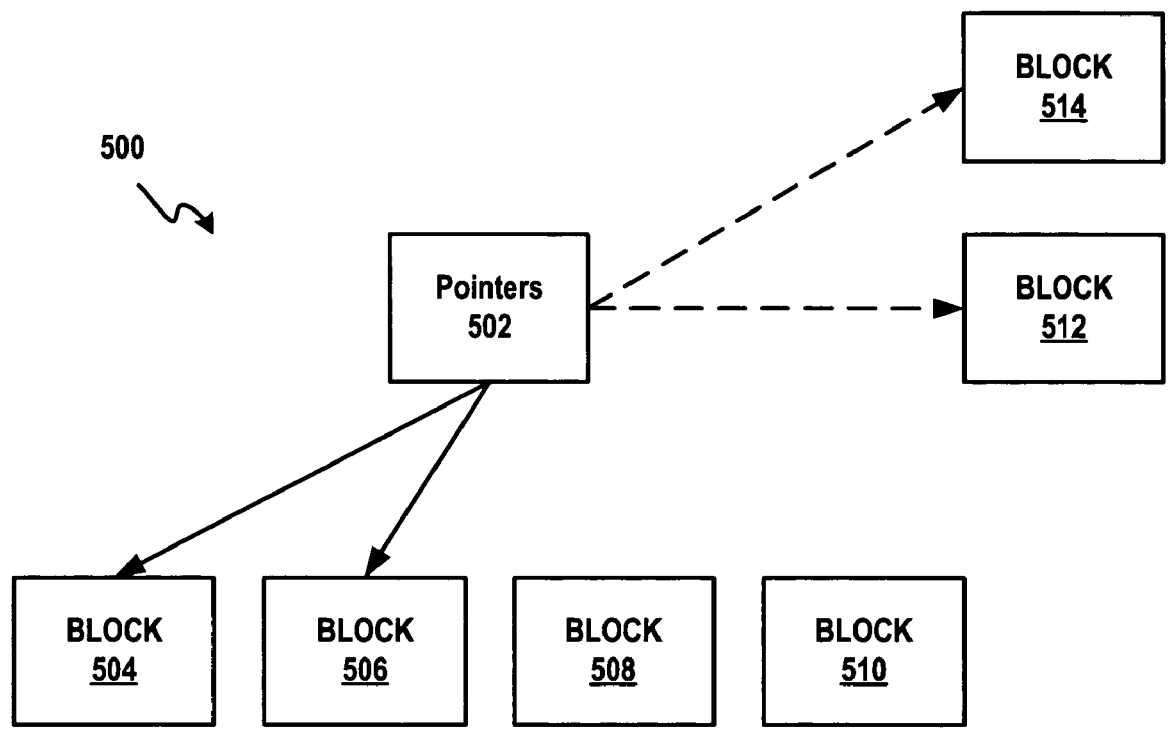

FIGS. 5A-5C illustrate a technique for creating point-in-time images in accordance with one embodiment of the invention. The point-in-time images may be stored in mass storage devices (e.g. in storage subsystem 104 of FIG. 1 or mass storage devices 205 of FIG. 2), or memory (e.g. memory 202 of FIG. 2). The point-in-time images may also be stored by a mirroring server (not shown).

As previously stated, a point-in-time image of data is a read-only view of data in a data set. As such, a point-in-time image may be a data structure that recreates a file structure of a volume including pointers that point to blocks that include the data stored by that file structure. In FIG. 5A, a file 500 includes pointers 502 to blocks 504-510 that store the data comprising the file. Each reference to the file 500 in a point-in-time image includes the pointers to blocks 504-510.

A point-in-time image may be recalled at a later time to recreate the state of a volume at the time the point-in-time image was created. When the volume is recreated, the pointers stored by the point-in-time image may point to blocks in previous point-in-time images.

For example, if, on Apr. 15, the file 500 includes data in blocks 504-510, a point-in-time image created on Apr. 15 will include pointers to blocks 504-510 representing the file 500. When the Apr. 15 point-in-time image is made, the blocks 504-510 to which the point-in-time image refers are locked. Accordingly, blocks 504-510 are not deleted until the Apr. 15 point-in-time image is deleted. In this way, blocks 504-510 are "backed by" the Apr. 15 point-in-time image. If one wanted to know the contents of a file on Apr. 15, one could recall the Apr. 15 point-in-time image. Embodiments of this invention identify dependencies of the Apr. 15 point-in-time image to allow Apr. 15 point-in-time image to be deleted, and therefore allow the blocks 504-510 to be deleted if desired.

If, after the Apr. 15 point-in-time image is created, but before an Apr. 16 point-in-time image is created, data in the block 510 is modified and written to a new block (such as in a write-out-of-place file system), when the Apr. 16 point-in-time image is created, the Apr. 16 point-in-time image will include new blocks of the file, pointers to the new blocks, and pointers to the old (unchanged) blocks.

For example, in FIG. 5B, a new point-in-time image is created which includes file 500 modified to include data stored in block 512 rather than block 510. The new point-in-time image includes new block 512, pointers to new block 512, and pointers to old blocks 504-508 containing data that had not changed. In this way, the modified file is backed by the Apr. 16 point-in-time image. If one wanted to know the contents of the file on Apr. 16, one could recall the Apr. 16 point-in-time image. Embodiments of this invention identify dependencies of the Apr. 16 point-in-time image to allow Apr.

16 point-in-time image to be deleted, and therefore allow the Apr. 15 point-in-time image to be deleted if desired.

Analogously, if, after the Apr. 16 point-in-time image is created, but before an Apr. 17 point-in-time image is created, data in the block 508 is modified and written to a new block, when the Apr. 17 point-in-time image is created, the Apr. 17 point-in-time image will include new blocks of the file, pointers to the new blocks, and pointers to the old blocks that had not changed.

For example, in FIG. 5C, a new point-in-time image is created which includes file 500 modified to include data stored in block 514 rather than block 508. The new point-in-time image includes new block 514, pointers to new block 514, and pointers to the old blocks 504-506 and 512 containing data that had not changed. Therefore, the Apr. 17 point-in-time image depends from the Apr. 16 point-in-time image, illustrating that a point-in-time image can depend on and lock another point-in-time image.

The latest modified file is backed by the Apr. 17 point-in-time image. If one wanted to know the contents of the file on Apr. 17, one could recall the Apr. 17 point-in-time image. Embodiments of this invention identify dependencies of the Apr. 17 point-in-time image to allow Apr. 17 point-in-time image to be deleted, and therefore allow the Apr. 16 point-in-time image to be deleted if desired.

Figure 6:
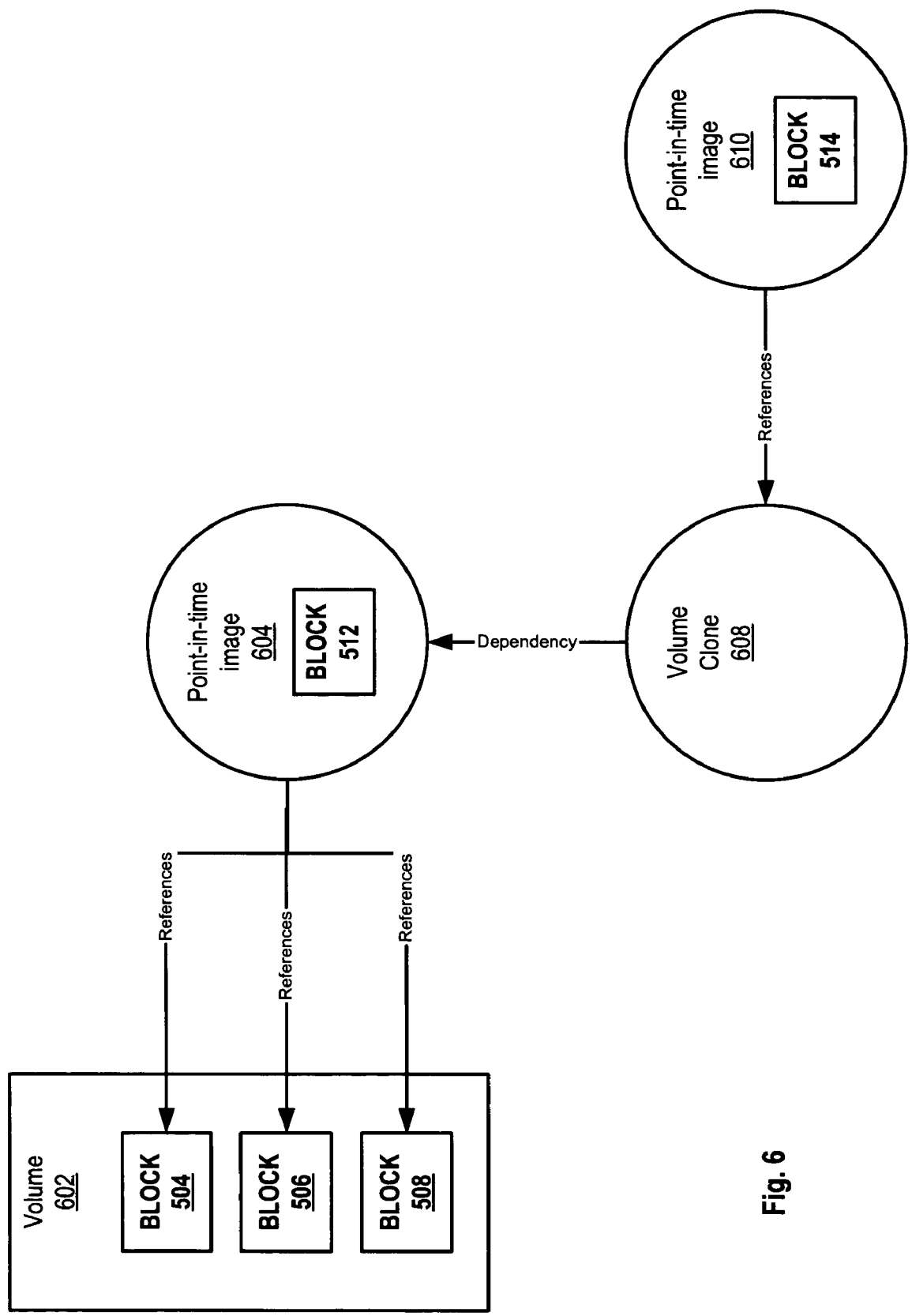
FIG. 6 illustrates a scenario in which a point-in-time image becomes locked.

FIG. 6 illustrates another scenario in which a point-in-time image becomes locked. In FIG. 6, point-in-time image 604 references blocks 504-508 in volume 602. Point-in-time image 604 also includes block 512 and pointers to block 512. To access the point-in-time image, e.g. for modification of block 512, volume clone 608 is created. A volume clone is a replicate (i.e. a copy) of a volume of storage. For example, a volume clone may be a replicate of a point-in-time image's entire contents and therefore provide access to modify the point-in-time image's entire contents. By contrast, a logical unit number (LUN) clone is a replicate of a subset of a point-in-time image's contents and therefore provides access to modify only a subset of the point-in-time image's content. In one embodiment, the volume clone 608 is a flexible volume (or FlexVol™) clone.

In FIG. 6, volume clone 608 allows modification of data in block 512 in point-in-time image 604. Therefore volume clone 608 is dependent on point-in-time image 604 and point-in-time image 604 is locked. To properly delete point-in-time image 604, the dependency between volume clone 608 and point-in-time image 604 is first broken. This dependency may be broken in more than one manner, e.g. by deleting or splitting volume clone 608, as will be described in further detail below. Embodiments of this invention identify this dependency and allow a user to determine the manner to break the dependency.

Before the dependency between volume clone 608 and point-in-time image 604 is broken, however, point-in-time image 610, which references volume clone 608, is to be deleted. Embodiments of this invention identify and present point-in-time image 610 as a object that is to be deleted before volume clone 608 is deleted, e.g. via a dependency graph as will be described in further detail below.

As can be seen from FIG. 6, point-in-time image 604 is locked by both volume clone 608 and point-in-time image 610. By providing a feature to access the contents of the point-in-time image 604, the point-in-time image 604 is locked and is not to be deleted until the dependencies associated with volume clone 608 and point-in-time image 610 are broken. A feature of a point-in-time image is an object (e.g. a logical unit number clone, a volume clone or another point-in-time image) that adds functionality to the point-in-time image, e.g. providing modification access to the point-in-time image.

Figure 7A:
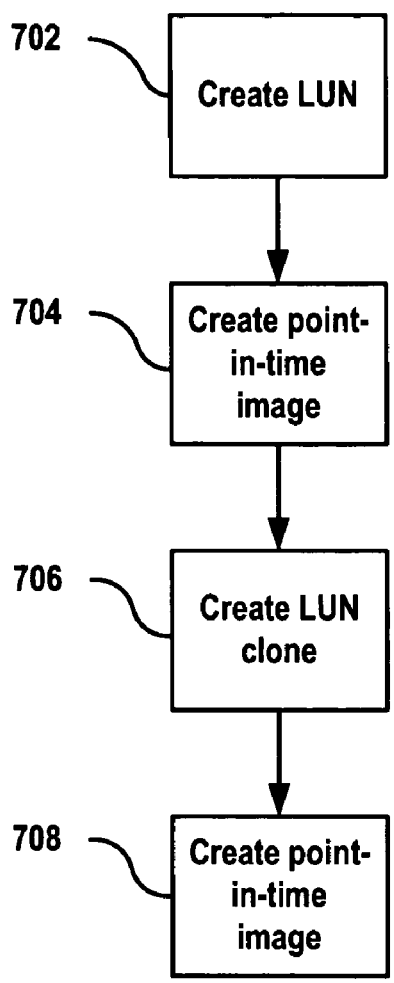
FIG. 7A illustrates a sequence of operations relating to logical unit numbers (LUNs) which locks a point-in-time image in accordance with one embodiment of the invention.

FIG. 7A illustrates how providing access to a subset of the contents of a point-in-time image has a similar affect. Specifically, FIG. 7A illustrates a sequence of operations relating to logical unit numbers (LUNs) which locks a point-in-time image in accordance with one embodiment of the invention.

Figure 7B:
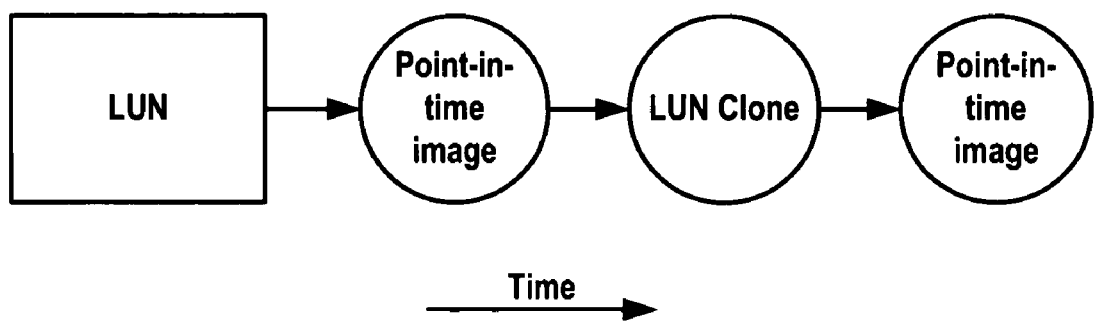
FIG. 7B is a timeline of objects created in the sequence of operations illustrated in FIG. 7A.

At 702, a LUN is created. At 704, a point-in-time image is created to capture the state of the volume containing the LUN at a particular point in time. At 706, a clone of the LUN is created, backed by the point-in-time image created at 704. At 708, another point-in-time image is created to capture the state of the volume after any modifications to the data is made, i.e. after the LUN clone was created at 706. FIG. 7B is a timeline of objects created in the sequence of operations illustrated in FIG. 7A.

In the scenario illustrated by FIGS. 7A and 7B, to delete the first point-in-time image created at 704 according to an embodiment of this invention, the point-in-time image created at 708 is first deleted. Then the dependency between the LUN clone and the first point-in-time image created at 704 is broken. In one embodiment, the dependency is broken by deleting the LUN clone. In another embodiment, the dependency is broken by splitting the LUN clone from the point-in-time image, as will be described in further detail below. After the dependency between the LUN clone and the first point-in-time image is broken, then the first point-in-time image created at 704 is deleted.

Figure 8A:
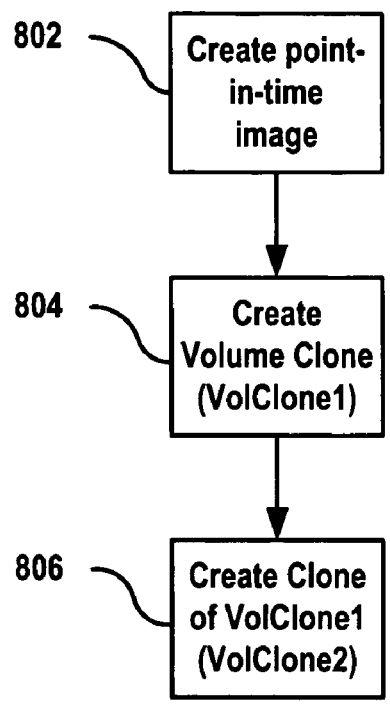
FIG. 8A illustrates another sequence of operations which locks a point-in-time image in accordance with one embodiment of this invention.
Figure 8B:
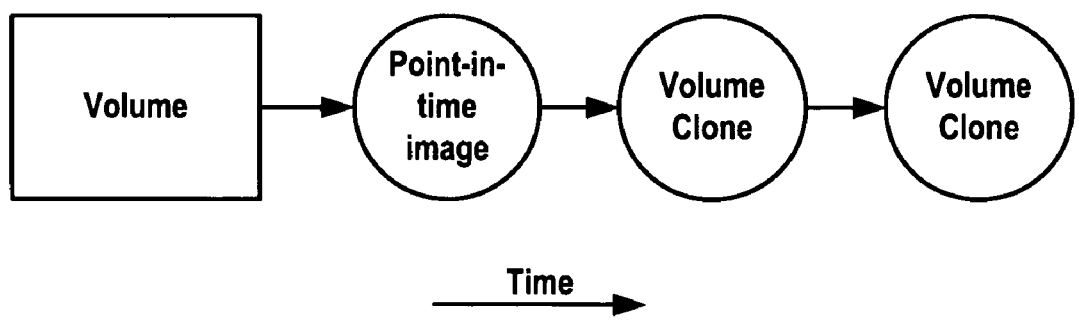
FIG. 8B is a timeline of objects created in the sequence of operations illustrated in FIG. 8A.

FIG. 8A illustrates another sequence of operations which locks a point-in-time image in accordance with one embodiment of this invention. At 802, a point-in-time image is created. At 804, a clone of the volume (VolClone1) is created. At 806, a clone of the clone (VolClone2) is created. FIG. 8B is a timeline of objects created in the sequence of operations illustrated in FIG. 8A.

In the scenario illustrated by FIGS. 8A and 8B, to delete the point-in-time image created at 804 according to an embodiment of this invention, the dependency between VolClone2 and VolClone1 is first broken. In one embodiment, this clone-clone dependency is broken by deleting VolClone2. In another embodiment, the dependency is broken by splitting VolClone2 from VolClone1. After the dependency between VolClone2 and VolClone1 is broken, the dependency between VolClone1 and the point-in-time image created at 802 broken. Finally, the point-in-time image created at 802 is deleted.

As can be understood from FIGS. 8A and 8B, in a storage system of this invention, clones of volume clones can be created. Similarly, clones of LUN clones can also be created. Accordingly, dependencies can exist between clones, as well as between clones and point-in-time images. Additionally, interdependencies can exist between point-in-time images.

Figure 9:
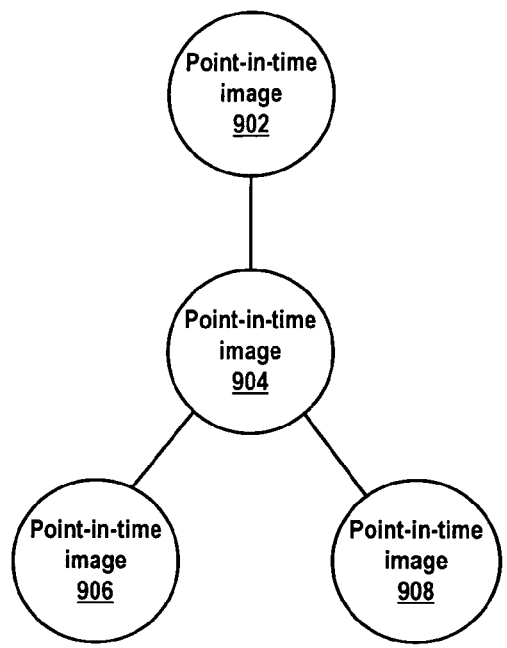
FIG. 9 illustrates interdependencies between point-in-time images in accordance with one embodiment of this invention.

FIG. 9 illustrates interdependencies between point-in-time images in accordance with one embodiment of this invention. In FIG. 9, point-in-time image 906 and 908 depend on point-in-time image 904. Point-in-time image 904 depends on point-in-time image 902. Therefore, to delete point-in-time image 902 according to one embodiment of this invention, point-in-time image 906 is first deleted, then point-in-time image 908 is deleted, then point-in-time image 904 is deleted, and then finally point-in-time image 902 is deleted (i.e. 906→908→904→902). In another embodiment, to delete point-in-time image 902, point-in-time image 908 is first deleted, then point-in-time image 906 is deleted, then point-in-time image 904 is deleted, and then finally point-in-time image 902 is deleted (i.e. 908→906→904→902).

Figure 10:
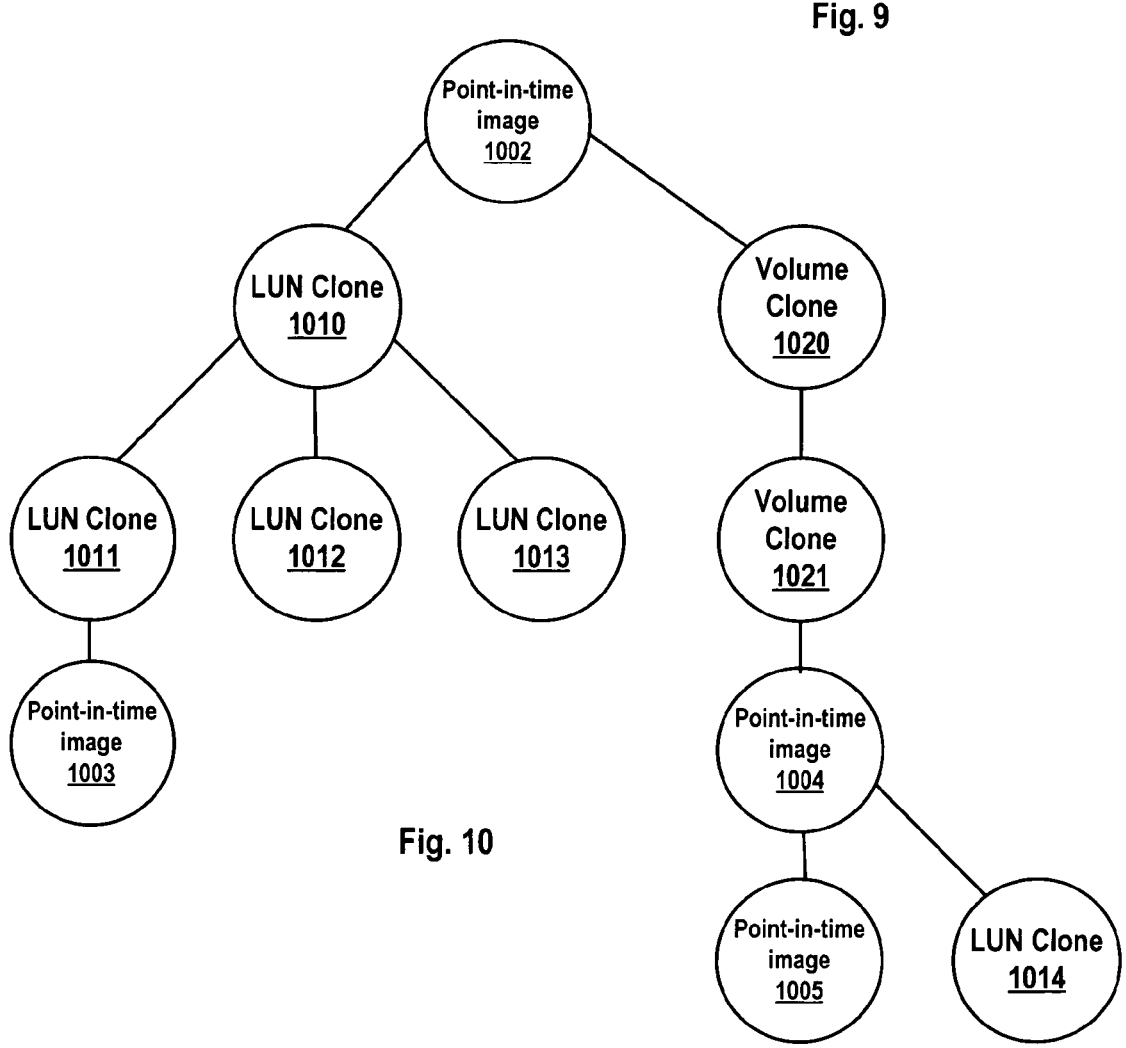
FIG. 10 illustrates various dependencies of one point-in-time image in accordance with one embodiment of this invention.

Therefore, as can be understood from FIGS. 6-9, a point-in-time image can have many levels of dependencies. FIG. 10 illustrates various dependencies of one point-in-time image in accordance with one embodiment of this invention. In particular, FIG. 10 illustrates various dependencies that may exist between a point-in-time image 1002 and objects that depend, directly or indirectly, on the point-in-time image (e.g. LUN clones 1010-1014, volume clones 1020-1021, and point-in-time images 1003-1005).

One or more of the dependencies shown in FIG. 10 relate to a feature that provides access to the point-in-time image 1002. For example, LUN clone 1010 provides access to a subset of the contents of point-in-time image 1002. Volume clone 1020 provides access to the entire contents of point-in-time image 1002. LUN clone 1010 and volume clone 1020 depend directly on point-in-time image 1002.

Other features that provide access to point-in-time image 1002 shown in FIG. 10 depend indirectly on point-in-time image 1002. For example, LUN clones 1011-1014 depend indirectly on point-in-time image 1002. LUN clones 1011-1013 depend directly on LUN clone 1010, while LUN clone 1014 depends directly on another point-in-time image, i.e. point-in-time image 1004. Accordingly, a LUN clone in accordance within an embodiment of this invention may depend on a point-in-time image or from another LUN clone.

In FIG. 10, volume clone 1021 and point-in-time images 1003-1005 also depend indirectly on point-in-time image 1002. Volume clone 1021 depends directly on volume clone 1020. Accordingly, a volume clone in accordance within an embodiment of this invention may depend on a point-in-time image or another volume clone.

Point-in-time image 1003 depends directly on LUN clone 1011. Point-in-time image 1004 depends directly on volume clone 1021. Point-in-time image 1005 depends directly on point-in-time image 1004. Accordingly, a point-in-time image in accordance within an embodiment of this invention may depend on a LUN clone, a volume clone, or another point-in-time image.

In addition to the examples of dependencies shown in FIG. 10 and described in FIGS. 6-9, a point-in-time image may have a dependency associated with an operation which locks the point-in-time image. For example, operations which replicate a point-in-time image depend on and lock the point-in-time image while the replication operation is in progress. As previously described, when a point-in-time image is locked, embodiments of this invention identify relationships that lock the point-in-time image to allow those relationships to be broken before the point-in-time image is deleted. Examples of operations that lock a point-in-time image are mirroring operations or collection operations.

Figure 11:
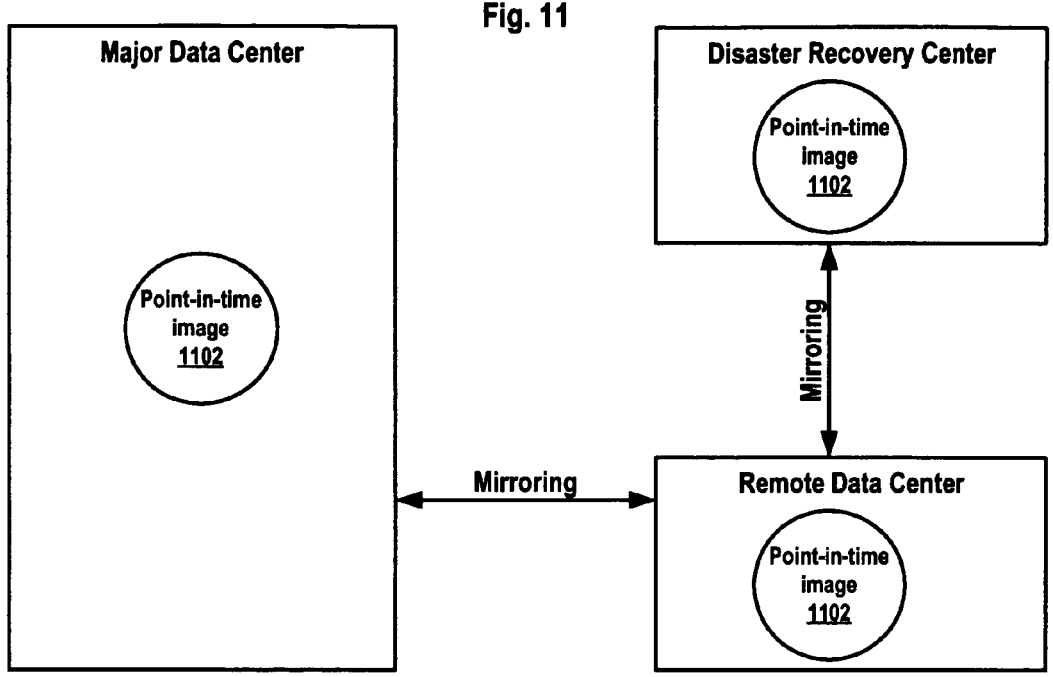
FIG. 11 illustrates mirroring operations which lock a point-in-time image in accordance with one embodiment of this invention.

FIG. 11 illustrates mirroring operations which lock a point-in-time image in accordance with one embodiment of this invention. Mirroring operations create a mirror version of a source data. In certain embodiments, the mirror version is a copy of the source data. In other embodiments, the mirror version is a pointer to the source data. In FIG. 11, point-in-time image 1102 in the major data center is locked while the point-in-time image 1102 in the major data center is being mirrored to the remote data center. The point-in-time image 1102 in the remote data center is a mirror version of the source data (i.e. point-in-time image 1102 in the major data center).

Embodiments of this invention identify this mirroring between the major data center and the remote data center while the operation is in progress. In one embodiment, the mirroring operation, and therefore the mirroring relationship (or dependency) is identified by detecting the mirror version of a source data (e.g. detecting the point-in-time image 1102 in the remote data center). This identification allows the mirroring relationship to be broken before the point-in-time image 1102 in the major data center (the source data) is deleted. The mirroring relationship is broken when the mirroring operation is canceled, completed, or otherwise terminated.

In FIG. 11, the point-in-time image 1102 in the remote data center is also locked while the point-in-time image 1102 in the remote data center is being mirrored to the disaster recovery center. The point-in-time image 1102 in the disaster recovery center is a mirror version of the source data (i.e. point-in-time image 1102 in the remote data center).

Analogously, embodiments of this invention identify this mirroring between the remote data center and the disaster recovery center while the operation is in progress, e.g. by detecting the mirror version (e.g. the point-in-time image 1102 in the disaster recovery center) of a source data (e.g. the point-in-time image 1102 in the remote data center). This identification allows the mirroring relationship to be broken before the point-in-time image 1102 in the remote data center is deleted.

Mirroring operations can be executed by using the SnapMirror® from Network Appliance, Inc. of Sunnyvale, Calif. SnapMirror® mirrors point-in-time images of file system volumes in one storage system to another storage system. The file system volume may be, for example, a volume of a WAFL® file system.

The mirroring relationship may be synchronous, semi-synchronous, or asynchronous. For example, in a synchronous mirroring relationship, every change that is made to a volume maintained by a source is written to a mirrored volume on a destination before the source considers the data to be written. In an asynchronous relationship, the destination periodically updates the mirror using changes made to the source since the last update. A semi-synchronous mirroring relationship is a hybrid of these two relationships. While a point-in-time image is being mirrored using SnapMirror®, the point-in-time image is locked to allow data in the point-in-time image to be replicated.

Figure 12:
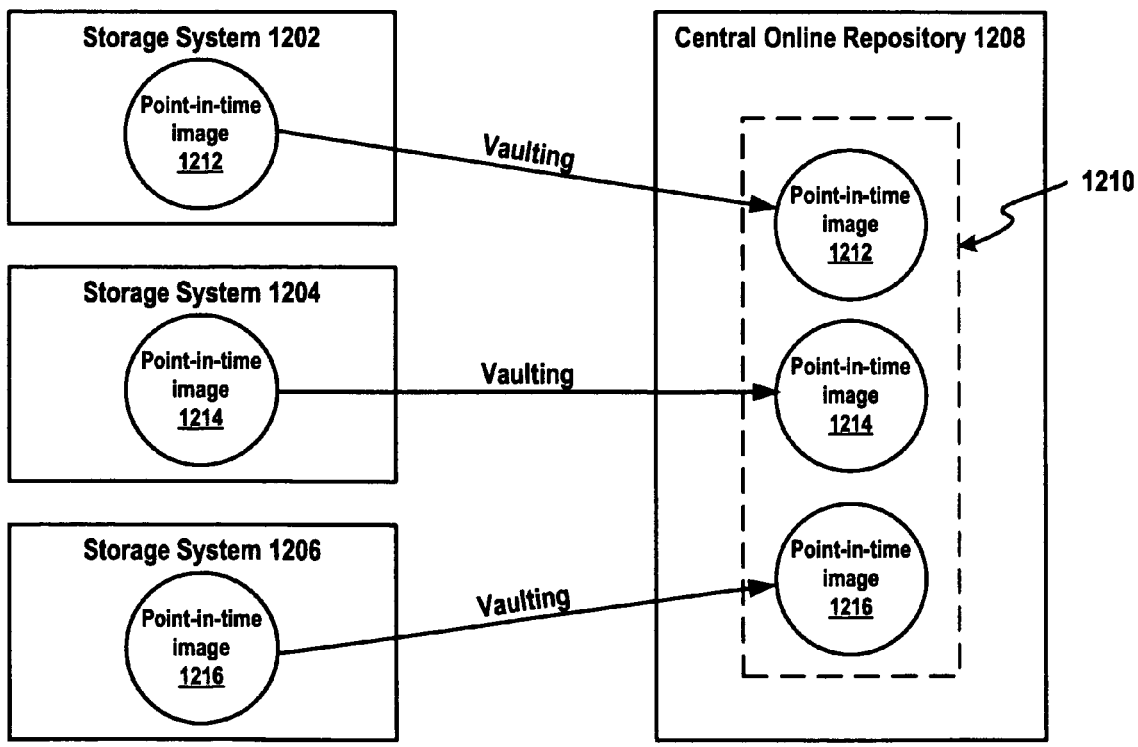
FIG. 12 illustrates the formation of a point-in-time image collection that locks a point-in-time image in accordance with one embodiment of this invention.

Another operation that locks a point-in-time image in accordance with embodiments of this invention is an operation that forms a point-in-time image collection, or a collection operation. FIG. 12 illustrates the formation of a point-in-time image collection that locks a point-in-time image in accordance with one embodiment of this invention. A point-in-time image collection is a collection of point-in-time images, e.g. a collection stored in a central location of point-in-time images originally stored in geographically distinct storage systems.

In FIG. 12, the collection operation selects point-in-time images 1212-1216 from storage systems 1202-1206, respectively, and places them in a collection 1210 in a centralized location, online central repository 1208. Each point-in-time image 1212-1216 in the collection 1210 is locked by the collection operation. Collection operations can be executed by using the SnapVault® from Network Appliance, Inc. of Sunnyvale, Calif. SnapVault® selects point-in-time images from multiple storage systems to back up onto a central repository. The point-in-time images form a collection of point-in-time images located in the central online repository accessible by a user.

Accordingly, embodiments of this invention identify dependencies formed while the collection operation (or vaulting) is in progress. This identification allows the dependencies to be broken before any of the point-in-time images (e.g. 1212-1216) in storage systems (e.g. 1202-1206) is deleted. Similar to dependencies formed by the mirroring operations described above, the dependencies formed by collection operations may be broken when the collection operation is canceled, completed, or otherwise terminated.

As can be understood from the discussion above, a given point-in-time image can have dependencies associated with features (e.g. LUN clones, volume clones or other point-in-time images), dependencies associated with a mirror version of the point-in-time image, and/or dependencies associated with a point-in-time image collection which includes the point-in-time image. These dependencies can create a complex structure, having several levels of dependencies, which only increases in complexity when a storage system is configured to automatically generate point-in-time images on a schedule. Embodiments of this invention identify these levels of dependencies to allow them to be broken in an appropriate order before the point-in-time image on which the dependencies depend is deleted, thereby allowing better management of the point-in-time image.

Figure 13:
FIG. 13 is a flowchart describing a process for managing a point-in-time image in accordance with one embodiment of this invention.
Figure 13:
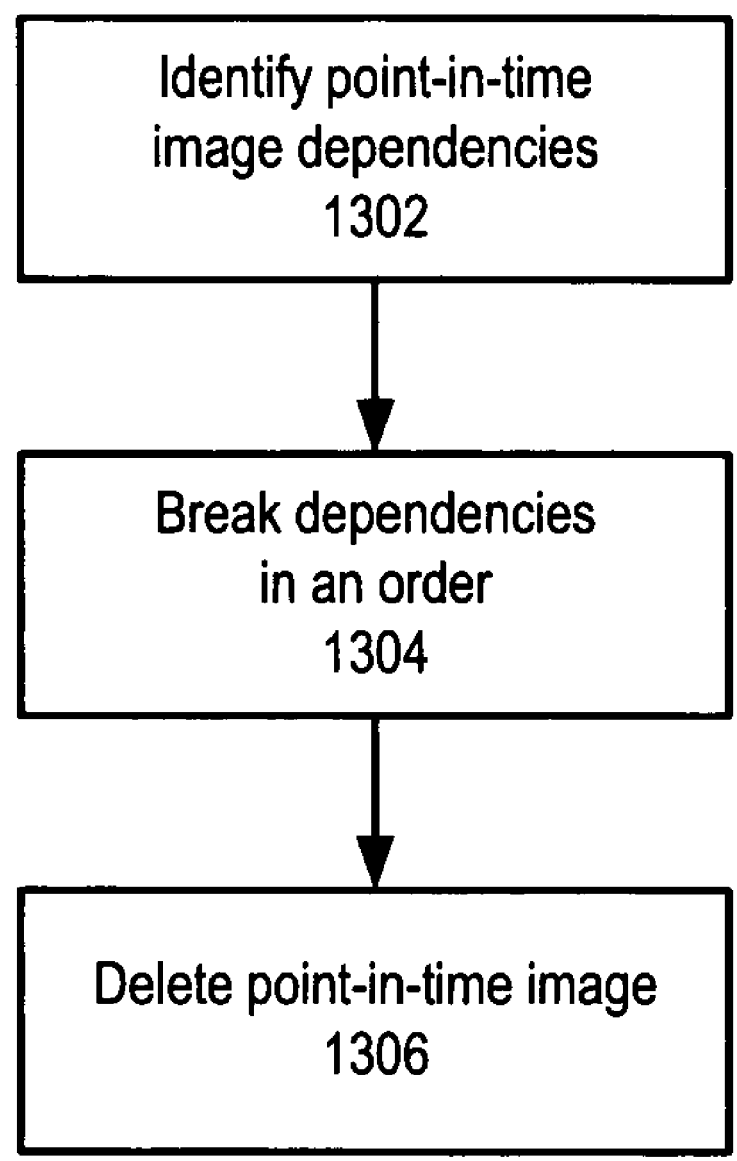

FIG. 13 is a flowchart describing a process for managing a point-in-time image in accordance with one embodiment of this invention. At 1302, dependencies of a point-in-time image are identified. For example, in one embodiment, the point-in-time image management module 306 (of FIG. 3) identifies the dependencies.

At 1304, the dependencies are broken in an order. For example, the point-in-time image management module 306 (of FIG. 3) may issue a command to break the dependencies. For example, if breaking the dependency includes deleting an object (e.g. a LUN clone), in one embodiment, point-in-time image management module 306 will issue a command to the storage subsystem 104 to delete the LUN clone. If breaking the dependency includes splitting a feature, in one embodiment, point-in-time image management module 306 will issue a command to the storage subsystem 104 to read any shared data and write that data to the feature.

In certain embodiments, the dependencies broken in 1304 are broken in response to a user's command via user interface 308. In other embodiments, these dependencies are broken in response to a configuration or policy accessible to the point-in-time image management module 306.

Similarly, in certain embodiments, the order in which to break the dependencies is determined by a user and communicated to the point-in-time image management module 306 via user interface 308. In other embodiments, the order in which to break the dependencies is determined by a system configuration or policy accessible by the point-in-time image management module 306.

At 1306, the point-in-time image is deleted. For example, the point-in-time image may be deleted from storage subsystem 104 or mass storage devices 205. Details of this process can be further understood from the description of the embodiments illustrated by FIGS. 14A-18.

Figure 14A:
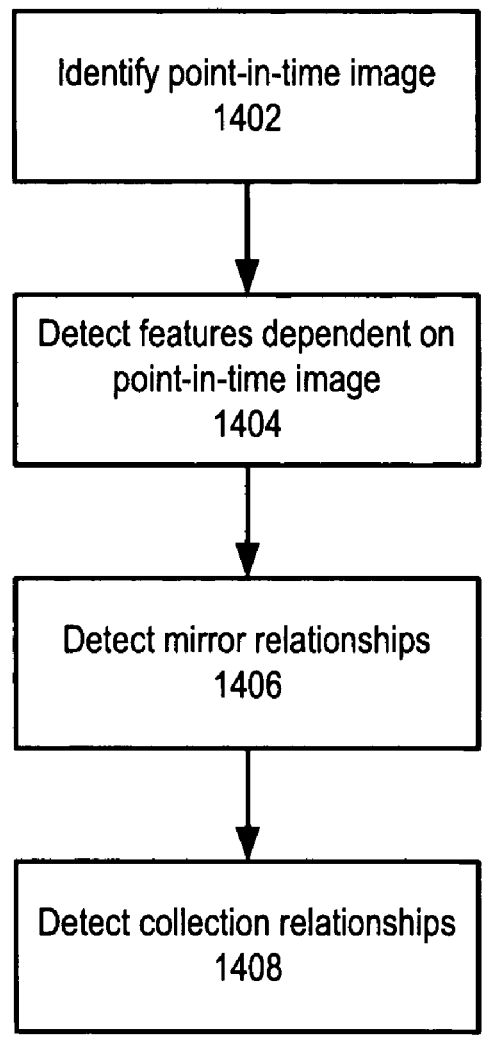
FIGS. 14A-14B are flowcharts describing processes for identifying point-in-time image dependencies in accordance with one embodiment of this invention.
Figure 14B:
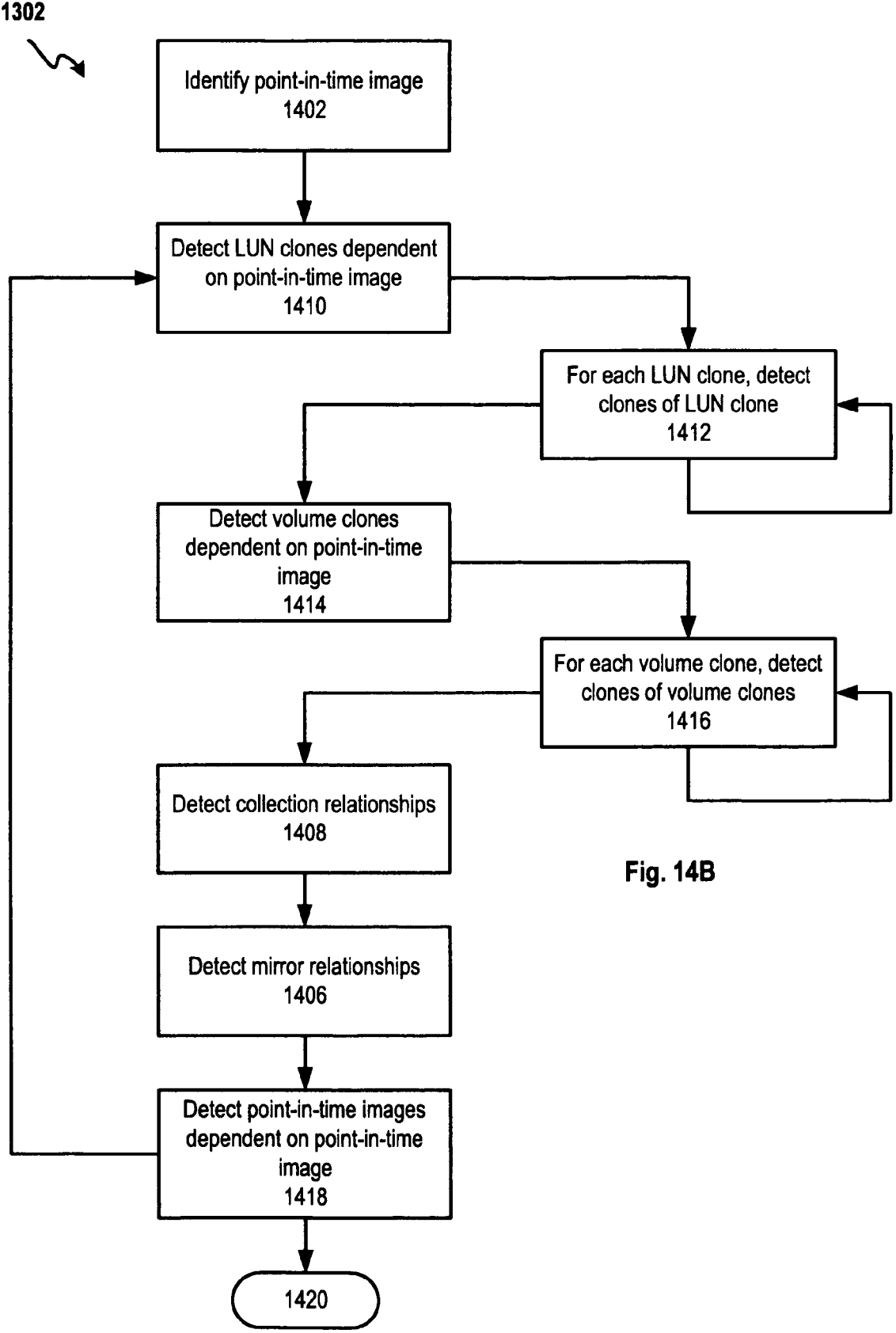

FIGS. 14A-14B are flowcharts describing processes for identifying point-in-time image dependencies in accordance with one embodiment of this invention. In FIG. 14A, to identify dependencies of a point-in-time image at 1302, a point-in-time image is first identified at 1402. In one embodiment, the point-in-time image is identified by a user and communicated via user interface 308 to the point-in-time image management module 306. In other embodiments, the point-in-time image is identified automatically by the point-in-time image management module 306 according to certain parameters which may be provided by a user via user interface 308, by a software program (e.g. an application or service), or by a system configuration or policy.

Features dependent on the point-in-time image at then detected at 1404 by the point-in-time image management module 306. One of these features may be, for example, a LUN clone, a volume clone or another point-in-time image. These features may be directly or indirectly dependent on the point-in-time image as described above.

In one embodiment, to detect a feature indirectly dependent on the point-in-time image, features previously identified as dependent on the point-in-time image are analyzed to detect a feature dependent on at least one of the previously identified features. For example, applying this process to the dependency structure of FIG. 10, LUN clone 1010 and volume clone 1020 are identified as dependent on point-in-time image 1002. Each of these features (LUN clone 1010 and volume clone 1020) is analyzed to detect a feature dependent on it. For example, LUN clone 1010 is analyzed to detect LUN clones 1011-1013. Each of these LUN clones 1011-1013 is then analyzed to detect point-in-time image 1003. In such a manner, features previously identified as dependent on the point-in-time image are analyzed. This recursive process allows features both directly and indirectly dependent on the point-in-time image identified in 1402 to be detected.

At 1406, mirror relationships are detected by the point-in-time image management module 306. For example, the mirror relationships described in FIG. 11 may be detected. As previously discussed, these mirror relationships lock a point-in-time image and are to be broken before the point-in-time image is deleted.

At 1408, collection relationships are detected by the point-in-time image management module 306. For example, the collection relationship described in FIG. 12 may be detected. As previously discussed, a collection relationship locks a point-in-time image and is to be broken before the point-in-time image is deleted.

In certain embodiments of the invention, the detections of 1404, 1406 and 1408 occur in a different order than the one shown in FIG. 14A. For example, mirror relationships may be detected at 1406 before features dependent on the point-in-time image are detected at 1404. Accordingly, the order of detection shown in FIG. 14A may vary depending on the embodiment of the invention. Features dependent on the point-in-time image identified in 1402 may be detected at 1404 before or after mirror relationships are detected at 1406 and before or after collection relationships are detected at 1408. Likewise, mirror relationships dependent on the point-in-time image identified in 1402 may be detected at 1406 before or after features are detected at 1404 and before or after collection relationships are detected at 1408. Likewise, collection relationships dependent on the point-in-time image identified in 1402 may be detected at 1408 before or after features are detected at 1404 and before or after mirror relationships are detected at 1406.

In FIG. 14B, to identify dependencies of a point-in-time image at 1302, a point-in-time image is first identified at 1402. At 1410, LUN clones dependent on the point-in-time image are detected by the point-in-time image management module 306. At 1412, for each LUN clone detected at 1410, any clones of the LUN clone are detected by the point-in-time image management module 306.

After this recursive process is completed, volume clones dependent on the point-in-time image are detected at 1414 by the point-in-time image management module 306. Similar to the detected LUN clones, for each volume clone detected, any clones of the volume clone are detected at 1416 by the point-in-time image management module 306.

After this recursive process is completed, the process continues to 1408 where collection relationships are detected. In the embodiment of FIG. 14B, after any collection relationships are detected, mirror relationships are then detected at

1406. At 1418, any point-in-time images dependent on the point-in-time image identified at 1402 are detected by the point-in-time image management module 306. If any point-in-time images are detected at 1418, the process repeats at 1410. Otherwise, the process ends at 1420.

In certain embodiments, the recursive detection of 1410 and 1412, the recursive detection of 1414 and 1416, and the detections of 1406 and 1408 occur in a different order than the one shown in FIG. 14B. For example, volume clones may be detected at 1414 and 1416 before LUN clones are detected at 1410 and 1412. In such an embodiment, if a point-in-time image is detected at 1418, the process will repeat at 1414 rather than 1410. Accordingly, the order of detection shown in FIG. 14B may vary depending on the embodiment of the invention. In addition, in storage systems in which mirroring or collection operations are not enabled or available, the detections at 1406 and 1408 may not be part of the dependency identification at 1302.

Figure 15:
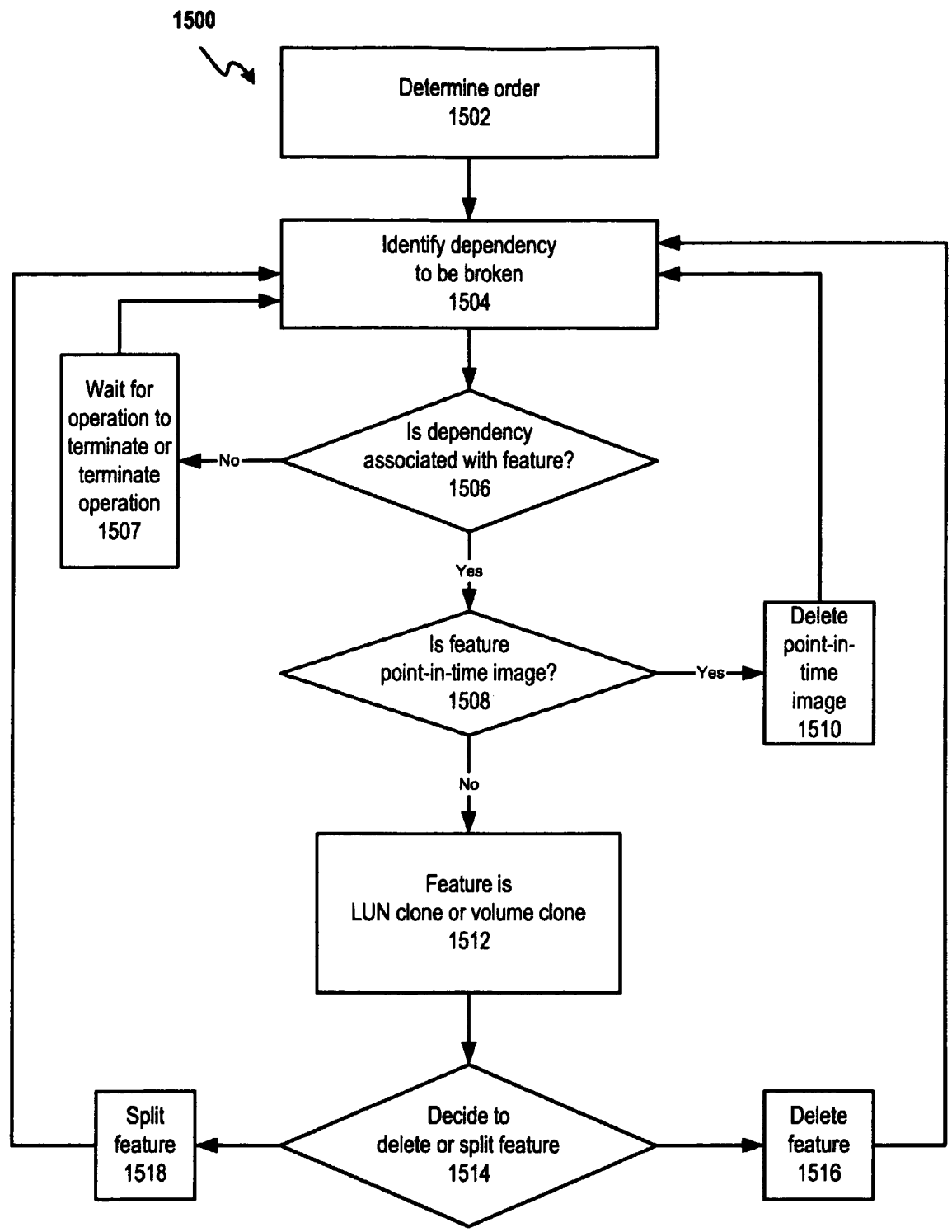
FIG. 15 is a flowchart describing a process for breaking dependencies in accordance with one embodiment of this invention.

As previously noted, the dependencies identified at 1302 are broken in an order at 1304. FIG. 15 is a flowchart describing a process for breaking dependencies in accordance with one embodiment of this invention. At 1502, an order to break the dependencies is determined. The order ensures that the dependencies identified to be broken at 1504 have no dependencies of their own that should first be broken.

In one embodiment, this order may be determined by a user (e.g. an administrator) via user interface 308 after being presented with a graph, e.g. as one of the graphs shown in FIGS. 17A-C and described in further detail below.

In another embodiment, this order may be determined automatically by the point-in-time image management module 306 based on the dependencies identified at 1302. For example, the point-in-time image management module 306 may be configured to identify times at which dependent relationships were created to determine a priority to break the dependencies as is described in further detail with regard to FIG. 18. In other embodiments, the point-in-time image management module 306 may use an algorithm to traverse a tree mapping the dependencies identified at 1302. This algorithm may be or include a post-order traversal algorithm or other iterative algorithms, for example.

At 1504, the first dependency to be broken in the order is identified (e.g. by a user via user interface 308 or by the point-in-time image management module 306). At 1506, the dependency is examined by the point-in-time image management module 306 to determine whether the dependency is associated with a feature. If the dependency is not associated with a feature (e.g. a LUN clone, a volume clone, or another point-in-time image), then the dependency is associated with an operation (e.g. mirroring or vaulting). Accordingly, at 1507, the operation may be terminated by the point-in-time image management module 306 or the process can wait for the operation to terminate independently. Once the operation terminates, the dependency is broken and the process returns to 1504 to identify the next dependency in the order to be broken.

If the dependency is a feature, then at 1508, the dependency is examined by the point-in-time image management module 306 to determine if the feature is another point-in-time image. If the feature is another point-in-time image, then the point-in-time image is deleted at 1510 by the point-in-time image management module 306 to break the dependency. The process then returns to 1504 to identify the next dependency in the order to be broken.

If the feature is not another point-in-time image, then, in this embodiment, the feature is either a LUN clone or a volume clone. At 1514, a decision is made whether break the dependency associated with the LUN clone or volume clone by deleting or splitting the feature. In certain embodiments, this decision is made by a user (e.g. an administrator) via user interface 308. In certain embodiments, this decision is made according to a storage system's policy or a default setting accessible to the point-in-time image management module 306.

If the decision is to delete the feature, then the feature is deleted at 1516 by the point-in-time image management module 306 (e.g. automatically or in response to a user command). The process then returns to 1504 to identify the next dependency in the order to be broken.

If the decision is to split the feature, then the feature is split at 1518 by the point-in-time image management module 306 (e.g. automatically or in response to a user command). The process then returns to 1504 to identify the next dependency in the order to be broken.

Figure 16A:
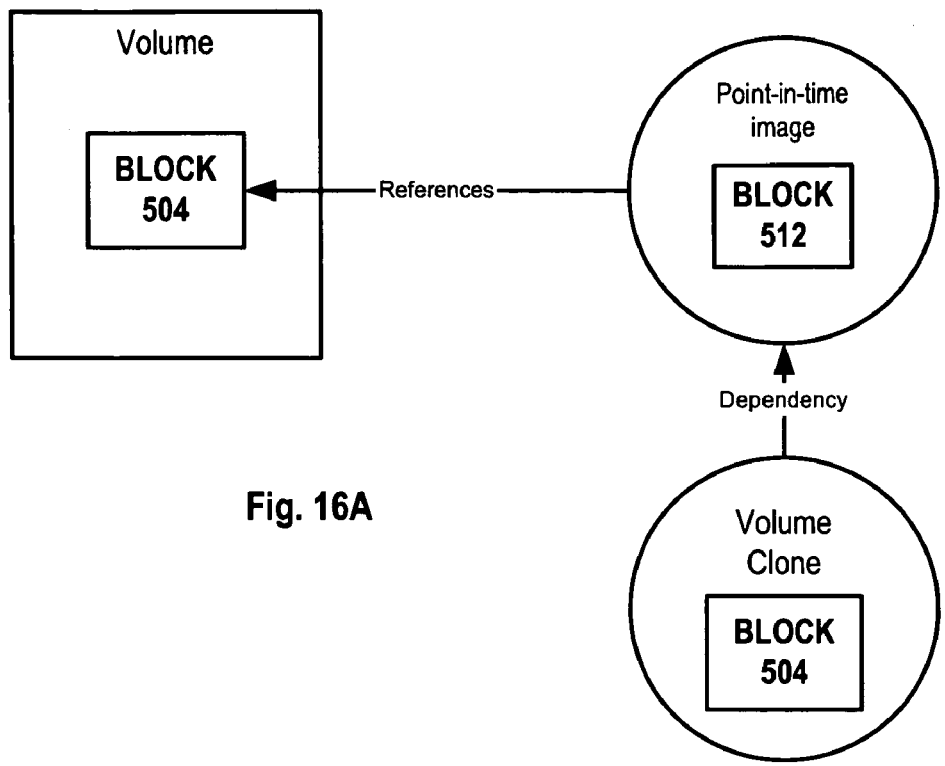
FIGS. 16A-16B illustrate a splitting of a feature in accordance with one embodiment of this invention.
Figure 16B:
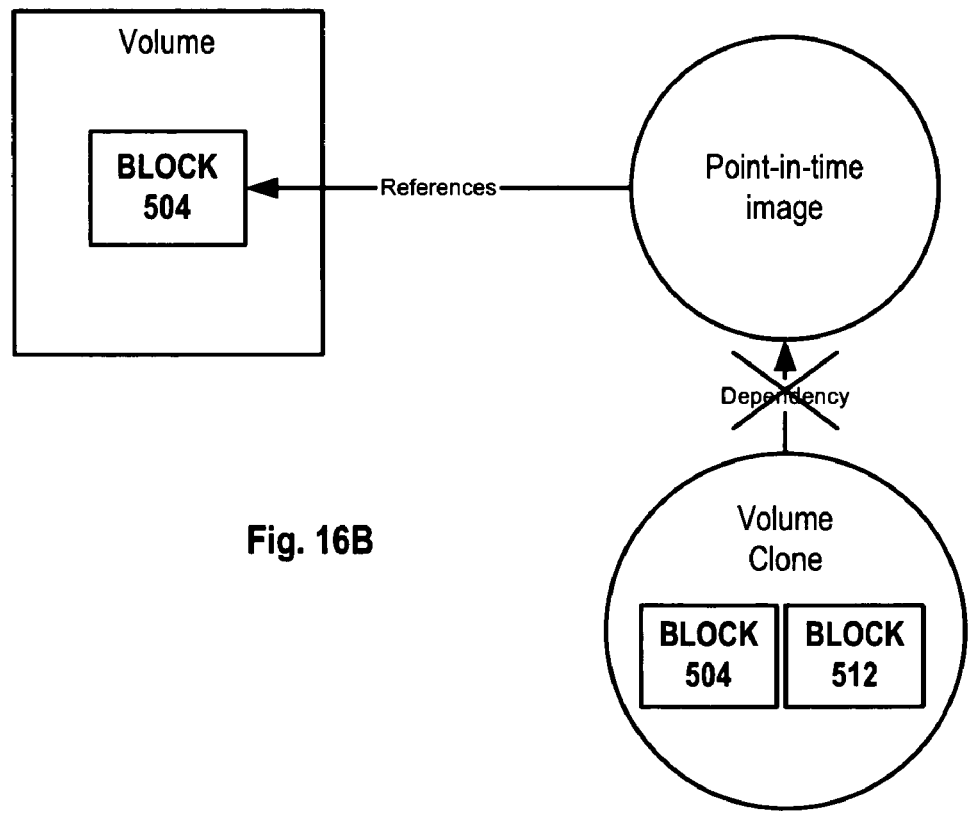

FIGS. 16A-16B illustrate a splitting of a feature in accordance with one embodiment of this invention. Splitting a feature copies dependent data from a source to the feature, thereby removing the feature's dependency on the source.

In FIG. 16A, the feature is a volume clone. The volume clone includes block 504, cloned from the actual volume. The volume clone points to block 512 in the point-in-time image and is therefore dependent on the point-in-time image. In FIG. 16B, the volume clone is split and the dependency broken by copying the data in the point-in-time image to the volume clone so that the volume clone no longer depends on the point-in-time image. Specifically, in FIG. 16B, block 512 is copied to the volume clone. The dependency is broken because the volume clone no longer shares any data with the point-in-time image. By splitting the feature rather than deleting it, the system may still retain the information that would be in the point-in-time image while freeing up storage space by deleting the point-in-time image after the point-in-time image dependencies are broken.

As previously stated, in certain embodiments, the decision whether to split or delete a feature is made by a user (e.g. an administrator). In certain embodiments, a user interface is provided to allow the user to determine which features to split or delete. This interface may additionally or alternatively allow the user to determine which point-in-time images to delete and an order in which to break dependencies. In certain embodiments, this user interface is text-based. In other embodiments, this user interface is graphical, and may include, for example, a dependency graph to illustrate the various numbers and levels of dependencies to an administrator.

Figure 17A:
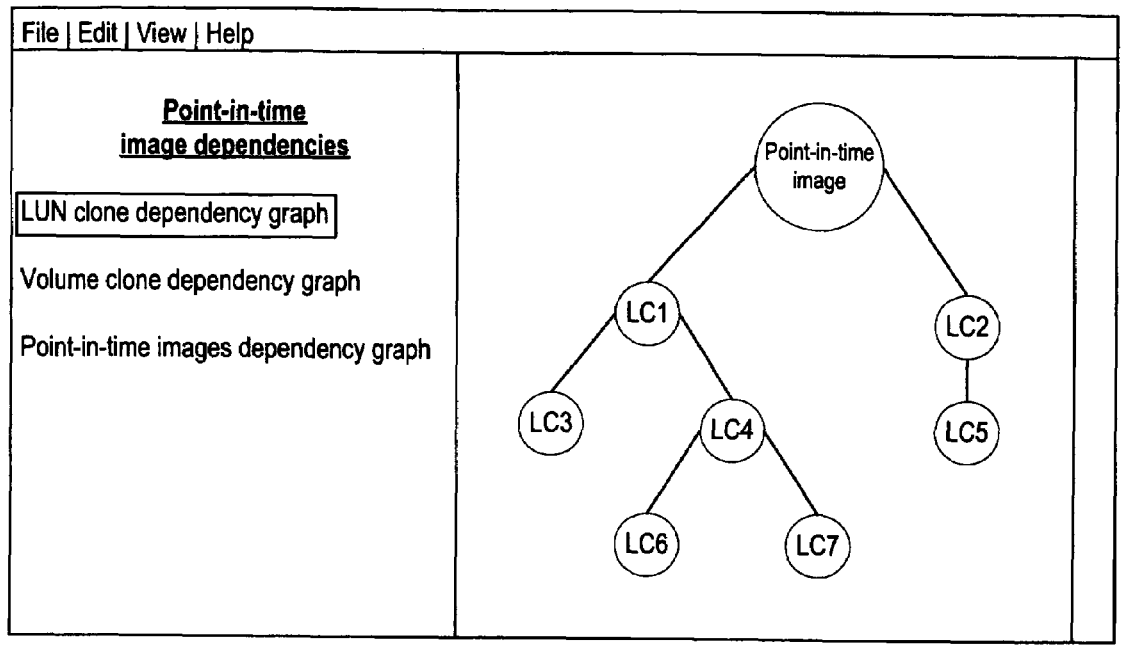
FIGS. 17A-C illustrate a user interface showing various dependency graphs in accordance with one embodiment of this invention.
Figure 17B:
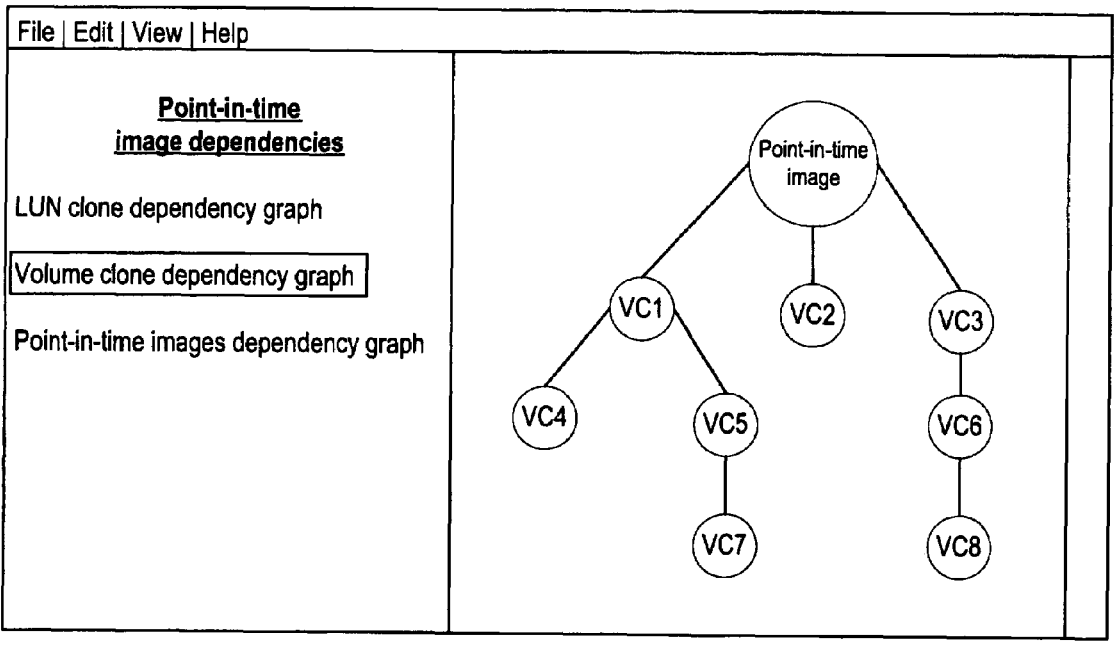
Figures 17C, 18:
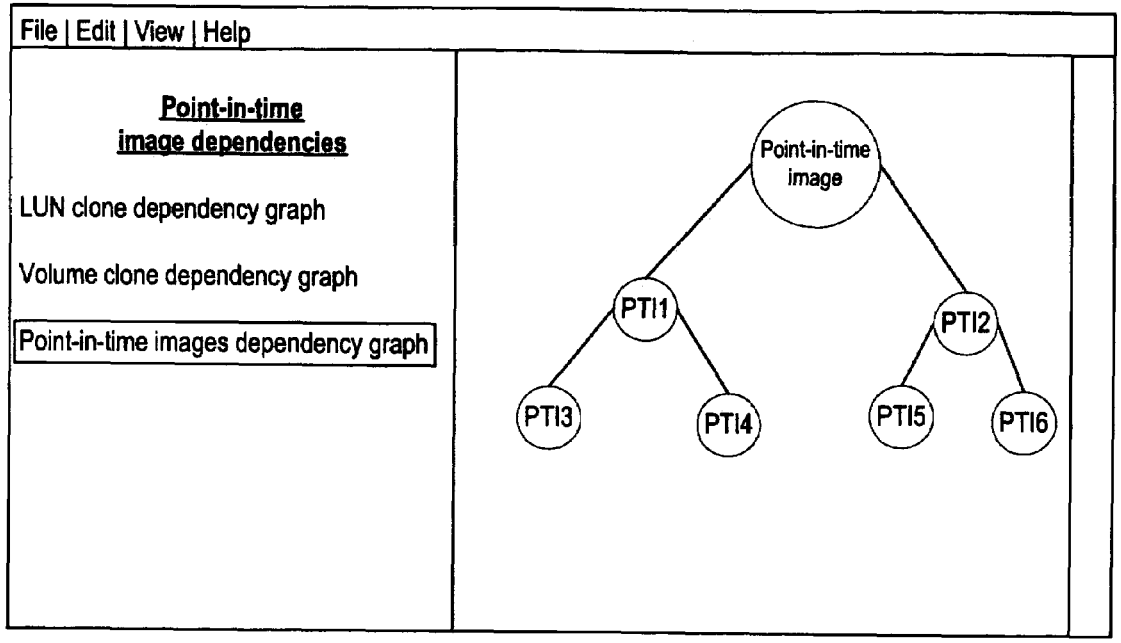
FIG. 18 is a table of various orders in which to break the dependencies shown in FIGS. 17A-C in accordance with various embodiments of this invention.

FIGS. 17A-C illustrate a user interface showing various dependency graph in accordance with one embodiment of this invention. Using this interface, a user may identify dependencies of a given point-in-time image, determine which dependencies to break and in which order, determine how to break the dependencies (e.g. splitting or deleting an associated feature), and/or issue a command to delete the point-in-time image after the point-in-time image's dependencies are broken.

In FIGS. 17A-C, three separate graphs are created, each dedicated to a single feature (e.g. LUN clones as shown in FIG. 17A, volume clones as shown in FIG. 17B, or point-in-time images as shown in FIG. 17C). Each graph illustrates the dependencies particular to each feature. The graphs shown in FIGS. 17A-C are one dimensional tree graphs, although it will be appreciated that in other embodiments, other types of graphs may be used and other features common to graphs may be used. For example, the graph may resemble an expandable directory tree. As another example, the nodes of the graph may be clickable to allow a user to drill down into details regarding the clicked node to determine, for example, the node's children.

In certain embodiments, the LUN clone dependency graph shown in FIG. 17A is created by creating a node (e.g. LC1) for each LUN clone detected (e.g. at 1410 and 1412 in FIG. 14B). Then parent-child relationships are mapped between each of the nodes (e.g. using lines) to illustrate the various dependencies.

A similar process for created a dependency graph may be used to create the volume clone dependency graph shown in FIG. 17B or the point-in-time image dependency graph shown in FIG. 17C. For example, the volume clone dependency graph shown in FIG. 17B may be created by creating a node (e.g. VC1) for each volume clone detected (e.g. at 1414 and 1416 in FIG. 14B). The point-in-time images dependency graph shown in FIG. 17C may also be created by creating a node (e.g. PTI1) for each point-in-time image detected (e.g. at 1418 in FIG. 14B).

The graphs shown in FIGS. 17A-C allow one to understand the various orders that may be determined at 1502 in FIG. 15. FIG. 18 is a table of various orders in which to break the dependencies shown in FIGS. 17A-C in accordance with various embodiments of this invention.

For example, the order determined at 1502 in FIG. 15 may be determined by traversing one of the graphs shown in FIGS. 17A-C in a post-order traversal. Under this traversal, a node is not visited until its children are visited. Accordingly, a post-order traversal of the graph shown in FIG. 17A would result first in visiting LC3. LC3 is a leaf node. A leaf node is a node without any children nodes. LC4 is not a leaf node. LC4 is LC3's sibling node. LC4 has children. Therefore, in a post-order traversal, LC4 cannot be visited until LC4's children are visited.

Therefore, after visiting LC3, LC6 and LC7 are visited. In certain embodiments, children nodes are visited from left to right (e.g. LC6 before LC7). In other embodiments, children nodes are visited from right to left (e.g. LC7 before LC6). After LC6 and LC7 are visited in the traversal, LC4 (the parent of LC6 and LC7) is visited. This continues so forth until the root node (point-in-time image) is reached. The result is the order shown in the first row of FIG. 18.

The first row of FIG. 18 indicates an order in which to break LUN dependencies before a point-in-time image is deleted in a post-order traversal in accordance with one embodiment of this invention. Specifically, the first row of FIG. 18 indicates that the dependency between LC3 and its parent (i.e. LC1) should first be broken, then the dependency between LC6 and its parent (i.e. LC4), then the dependency between LC7 and its parent (i.e. LC4), and so forth, until the dependency between LC2 and the point-in-time image is broken (e.g. by deleting or splitting LC2).

The second row of FIG. 18 indicates an order in which to break volume clone dependencies before a point-in-time image is deleted in a post-order traversal in accordance with one embodiment of this invention. Specifically, the second row of FIG. 18 indicates that the dependency between VC4 and its parent (i.e. VC1) should first be broken, then the dependency between VC7 and its parent (i.e. VC5), then the dependency between VC5 and its parent (i.e. VC1), and so forth, until the dependency between VC3 and the point-in-time image is broken (e.g. by deleting or splitting VC3).

The third row of FIG. 18 indicates an order in which to break point-in-time images dependencies locking a particular point-in-time image before deleting the particular point-in-time image in a post-order traversal in accordance with one embodiment of this invention. Specifically, the third row of FIG. 18 indicates that the dependency between PTI3 and its parent (i.e. PTI1) should first be broken, then the dependency between PTI4 and its parent (i.e. PTI1), then the dependency between PTI5 and its parent (i.e. PTI2), and so forth, until the dependency between PTI2 and the point-in-time image is broken (e.g. by deleting PTI2).

In another embodiment, the order to break the dependencies is determined by traversing one of the graphs shown in FIGS. 17A-C level-by-level rather than by a post-order traversal. By traversing a graph level-by-level, leaf nodes across branches are traversed before parents of those leaf nodes are traversed. For example, in the tree graph shown in FIG. 17A, the lowest leaf nodes are first traversed, LC6 and LC7. In certain embodiments, the nodes are traversed from left to right (e.g. LC6 before LC7). In other embodiments, the nodes are traversed from right to left (e.g. LC7 before LC6).

After these nodes (LC6 and LC7) are traversed, the next level of nodes are traversed, LC3, LC4 and LC5. This traversal continues up the tree until the root node (representing the point-in-time image) is reached. The result is an order shown in the fourth row of FIG. 18. The fifth and sixth rows of FIG. 18 show, respectively, orders to break volume clone dependencies and point-in-time images dependencies in a level-by-level traversal in accordance with embodiments of this invention.

In one embodiment of the invention, an algorithm that traverses a dependency tree in this level-by-level manner may include, as a variable, the time when the dependencies are created. For example, because volume clones dependent on another volume clone are generally created later in time, the dependent volume clones generally will be graphed at a lower level. Accordingly, an algorithm that traverses a volume clone dependency tree in a level-by-level manner, in one embodiment of the invention, uses the volume clone creation time to determine the order shown in row four of FIG. 18.

In row six of FIG. 18, the order shown results from using a creation time to determine levels of a dependency graph, as well as a sequence to traverse nodes at a particular level in the dependency graph. Accordingly, if PTI1 was created first and PTI6 created last, the resulting order would be PT16, PT15, PT14, PT13, PT12, and PTI1, which appears to traverse the graph shown in FIG. 17C level-by-level from right-to-left, rather than level-by-level from left-to-right.

Thus, a method and system for managing storage space in a system storing a point-in-time image of data is described. In the above detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail so as not to obscure the present invention.

The above provides variations and examples of various aspects of embodiments of the invention. It will be appreciated that the above variations and examples are not intended to be exhaustive or to limit the invention to the precise forms disclosed. These variations and examples are to provide further understanding of embodiments of the present invention.

Accordingly, although the present invention, for purpose of explanation, has been described with reference to specific exemplary embodiments, it will be recognized that the invention is not limited to the embodiments described, but can be practiced with modification and alteration within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, magnetic optical disks, read only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or writing the media in question. Specialty apparatus may include a collection of readily available pieces or an application specific integrated circuit (ASIC) including a series of logic blocks, for example.

The method of the invention may be implemented using computer software. If written in a programming language conforming to a recognized standard sequence of instructions, the methods can be compiled for execution on a variety of hardware platforms or machines and for interface to a variety of operating systems. In addition the present invention is not described with reference to any particular programming language. It will be appreciated that a variety of programming languages may be used to implement the teachings of the invention as described herein.

What is claimed is:

1. A method to delete a point-in-time image in a set of data in a storage server, the method comprising:
    identifying dependencies of the point-in-time image in the storage server;
    breaking the dependencies in an order in the storage server; and
    deleting the point-in-time image in the storage server after the dependencies are broken.

2. The method of claim 1 wherein identifying the dependencies comprises at least one of:
    detecting a feature dependent, directly or indirectly, on the point-in-time image;
    detecting a mirror version of the point-in-time image; and
    detecting a point-in-time image collection which includes the point-in-time image.

3. The method of claim 2, wherein detecting a feature indirectly dependent on the point-in-time image comprises analyzing features previously identified as dependent on the point-in-time image to detect a feature dependent on at least one of the previously identified features.

4. The method of claim 2, wherein the feature is selected from the group consisting of: a logical unit number (LUN) clone, a volume clone, and another point-in-time image.

5. The method of claim 4, wherein, when a dependency is associated with a feature, breaking the dependency comprises:
    deleting the feature if the feature is another point-in-time image; and
    either deleting or splitting the feature if the feature is a LUN clone or a volume clone.

6. The method of claim 5, further comprising deciding whether to delete or split the feature based on a user input.

7. The method of claim 5, wherein splitting the feature comprises copying shared data to the feature, wherein the shared data comprises at least one of data shared between the feature and other features or data shared between the feature and the point-in-time image.

8. The method of claim 1, further comprising generating a graph to visually depict the dependencies.

9. The method of claim 8, wherein the graph is a tree graph and the order is determined by traversing the graph in a post-order traversal.

10. The method of claim 8, wherein the graph is a tree graph and the order is determined by traversing leaf nodes across branches before traversing parents of the leaf nodes.

11. A method to manage storage space in a storage system, the method comprising:
    receiving at the storage system a request to delete from a storage space a point-in-time image of a data set stored in the storage system;
    in response to the request, identifying dependencies of the point-in-time image in the storage system, wherein at least one of the dependencies is associated with a feature dependent on the point-in-time image;
    generating a graph in a storage system to represent relationships between the point-in-time image and said at least one of the dependencies;
    presenting the graph to a user;
    in response to input from the user, breaking the dependencies in an order in a storage system; and
    deleting from the storage space the point-in-time image after the dependencies are broken in the storage system.

12. The method of claim 11, wherein the graph is a tree graph and the order is based on a post-order traversal of the tree graph.

13. The method of claim 12, wherein the graph consists of child nodes which map exclusively to LUN-clones, exclusively to volume clones, or exclusively to other point-in-time images.

14. The method of claim 11, wherein identifying the dependencies further comprise identifying at least one of a mirror version of the point-in-time image or a point-in-time image collection which includes the point-in-time image.

15. The method of claim 11, wherein the request is in response to an insufficient storage space warning.

16. A storage system comprising:
    a machine readable storage medium having stored therein
        a point-in-time image generation module to generate point-in-time images of data in a data set stored in the storage system;

an access module to create dependencies on a point-in-time image to provide access to the point-in-time image; and deletion module to identify the dependencies, to break the dependencies in an order, and to delete the point-in-time image.

17. The system of claim 16, wherein the data comprise at least one of a file, a directory hierarchy, a volume, or a logical unit number (LUN).

18. The system of claim 16, wherein the access is to modify data shown in the point-in-time image.

19. A storage server comprising:
a network interface through which to communicate with one or more clients over a network;
a storage interface through which to communicate with an array of storage devices;
a processor to implement a file system to store data in the array of storage devices; and
a memory storing instructions which, when executed by the processor, cause the server to perform a set of operations comprising:
identifying dependencies of a first point-in-time image;
if the dependencies include a LUN clone, generating a first graph mapping the LUN clone to the first point-in-time image;
if the dependencies include a volume clone, generating a second graph mapping the volume clone to the first point-in-time image;
if the dependencies include a second point-in-time image, generating a third graph mapping the second point-in-time image to the first point-in-time image;
for each graph, breaking the mapped dependencies in an order; and
deleting the first point-in-time image after the dependencies in each graph are broken.

20. The storage server of claim 19 wherein the set of operations further comprises detecting operations locking the first point-in-time image and waiting for the operations to terminate before deleting the first-point-in-time image.

21. A processing system comprising:
a processor; and
a memory storing instructions which, when executed by the processor, cause the processing system to perform a set of operations including:
identifying dependencies of a point-in-time image of a set of data in a storage system, wherein at least one of the dependencies is associated with a feature that is dependent on the point-in-time image;
generating a graph to represent relationships between the point-in-time image and said at least one of the dependencies;
presenting the graph to a user;
in response to input from the user, breaking the dependencies in a determined order; and
deleting the point-in-time image from a storage space after the dependencies are broken.

22. The processing system of claim 21, wherein the set of operations further includes determining the order in which the dependencies are to be broken.

23. The processing system of claim 22, wherein the graph is a tree graph and the order is based on a post-order traversal of the tree graph.

24. The processing system of claim 23, wherein the graph consists of child nodes which map exclusively to LUN-clones, exclusively to volume clones, or exclusively to other point-in-time images.

25. The processing system of claim 21, wherein identifying the dependencies further comprise identifying at least one of a mirror version of the point-in-time image or a point-in-time image collection which includes the point-in-time image.

26. The processing system of claim 21, wherein the set of operations is triggered by a request to delete the point-in-time image.

27. The processing system of claim 26, wherein the request to delete is in response to an insufficient storage space warning.

\* \* \* \* \*